US010718263B2

(12) United States Patent
Alonso

(10) Patent No.: US 10,718,263 B2
(45) Date of Patent: Jul. 21, 2020

(54) OPPOSED-PISTON COMPACT ENGINE WITH CRANKSHAFTS ROTATING ON A DIFFERENT PLANT TO THOSE OF THE CYLINDER AXES

(71) Applicant: TWO HEADS, LLC, Washington, DC (US)

(72) Inventor: Jose Luis Alonso, Montevideo (UY)

(73) Assignee: TWO HEADS, LLC

( * ) Notice: Subject to any disclaimer, the term of this patent is extended or adjusted under 35 U.S.C. 154(b) by 0 days.

(21) Appl. No.: 16/093,143

(22) PCT Filed: May 27, 2016

(86) PCT No.: PCT/US2016/034502
§ 371 (c)(1),
(2) Date: Oct. 11, 2018

(87) PCT Pub. No.: WO2017/146754
PCT Pub. Date: Aug. 31, 2017

(65) Prior Publication Data
US 2019/0170063 A1    Jun. 6, 2019

Related U.S. Application Data

(60) Provisional application No. 62/297,970, filed on Feb. 22, 2016.

(51) Int. Cl.
*F02B 75/28* (2006.01)
*F01B 7/14* (2006.01)
(Continued)

(52) U.S. Cl.
CPC .............. *F02B 75/282* (2013.01); *F01B 7/14* (2013.01); *F01M 1/14* (2013.01); *F01M 3/00* (2013.01);
(Continued)

(58) Field of Classification Search
CPC ........ F02B 75/282; F02B 75/28; F02B 75/32; F01B 7/14; F01B 7/00; F16J 1/08;
(Continued)

(56) References Cited

U.S. PATENT DOCUMENTS 7,942,116 B2    5/2011  Major
8,413,619 B2    4/2013  Cleeves
(Continued)

FOREIGN PATENT DOCUMENTS

DE    19812800    9/1999
GB    2512652     10/2014

*Primary Examiner* — Jacob M Amick
(74) *Attorney, Agent, or Firm* — Fresh IP PLC; Aubrey Y Chen

(57) ABSTRACT

This invention relates to the field of opposed-piston engines having two pistons in one cylinder configured to have facing heads. Specifically, this is an engine with two crankshafts, two piston heads facing each other in a single cylinder, with the following features: compact size relative to a comparable design, improved or equivalent performance to a comparable design as a result of any of the following: locating crankshafts in a different plane from the cylinder axes; the use of shared duct structures; and the use of an embedded compressor chamber for efficient operation to cover all volumetric requirements, fulfilling the entire thermodynamic cycle, and performing in addition the sweeping and overloading of air or an air/fuel mixture in the cylinder combustion chamber in each revolution of two or more crankshafts, either with or without advancement between the crankshafts.

31 Claims, 33 Drawing Sheets

(51) Int. Cl.
*F02F 7/00* (2006.01)
*F01M 1/14* (2006.01)
*F01M 3/00* (2006.01)
*F16J 1/08* (2006.01)
*F16J 9/12* (2006.01)
*F01B 9/02* (2006.01)
*F02B 33/04* (2006.01)
*F02B 33/10* (2006.01)

(52) U.S. Cl.
CPC ............ *F02B 75/28* (2013.01); *F02F 7/0009* (2013.01); *F02F 7/0019* (2013.01); *F16J 1/08* (2013.01); *F16J 9/12* (2013.01); *F01B 9/026* (2013.01); *F02B 33/04* (2013.01); *F02B 33/10* (2013.01)

(58) Field of Classification Search
CPC ... F16J 9/12; F01M 3/00; F02F 7/0019; F02F 7/0009
See application file for complete search history.

(56) References Cited

U.S. PATENT DOCUMENTS

| | | | |
|---|---|---|---|
| 2009/0223482 A1* | 9/2009 | Schmitz | F01L 1/36 123/311 |
| 2016/0032822 A1* | 2/2016 | McClearen | F02B 75/28 123/51 B |

* cited by examiner

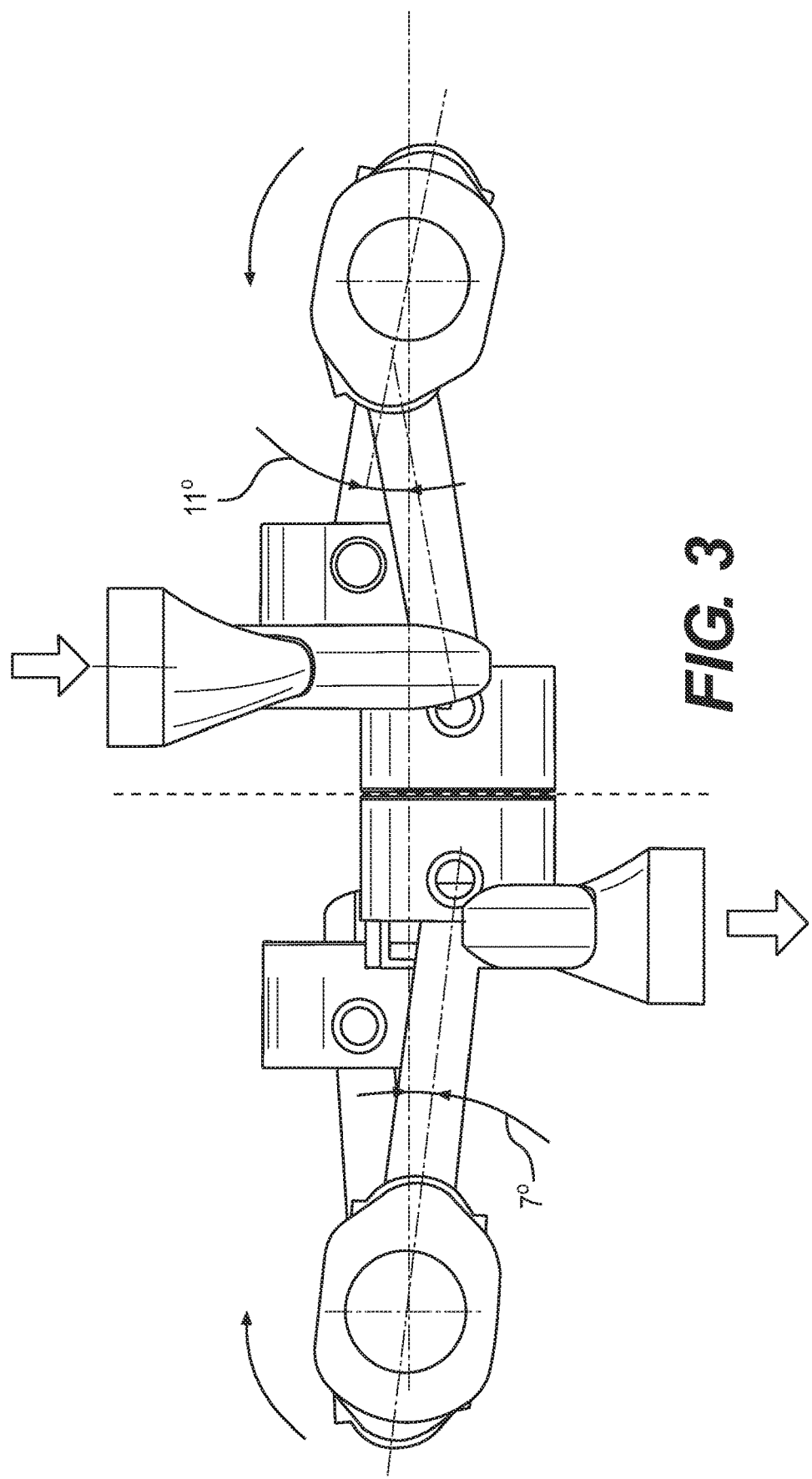

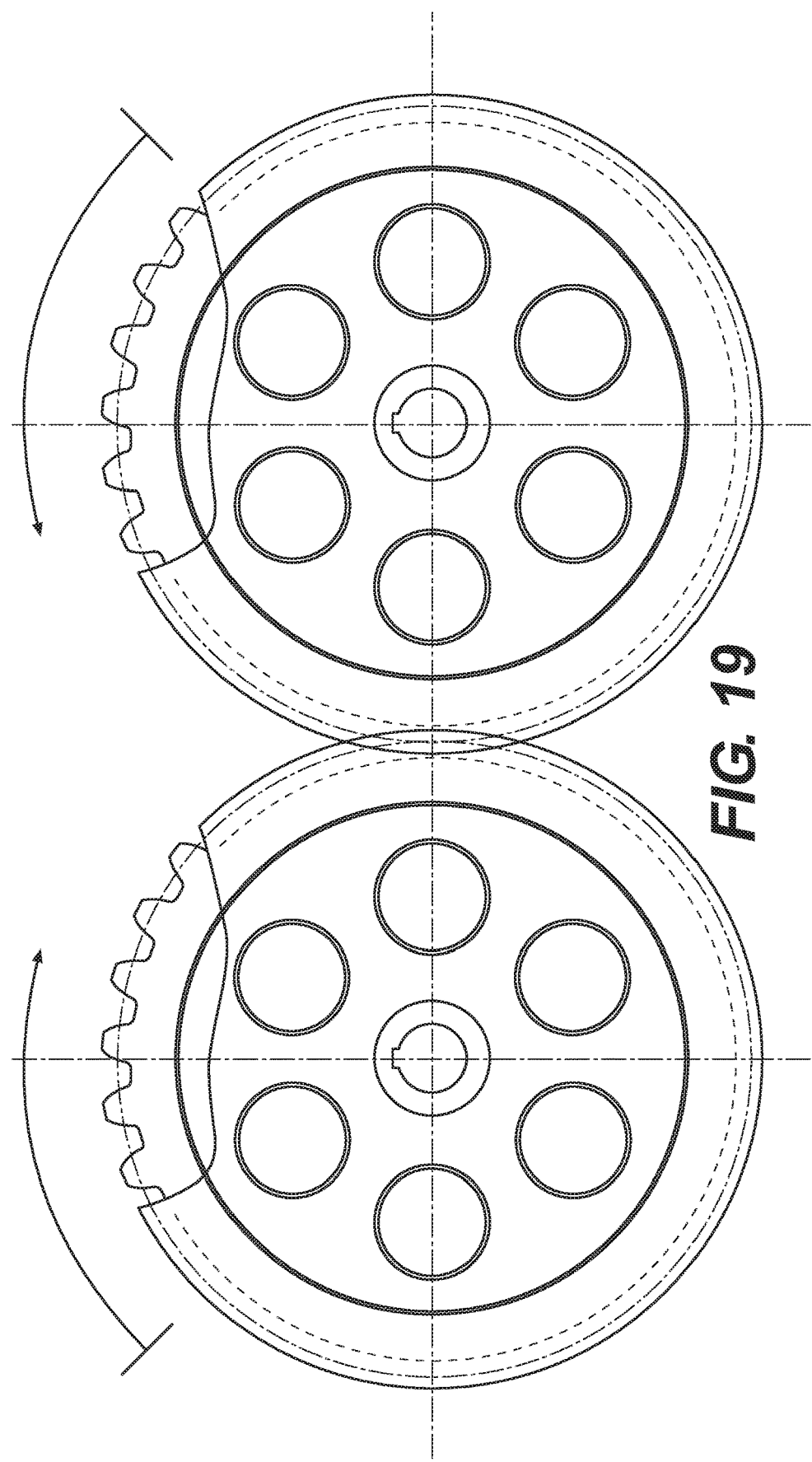

OPPOSED-PISTON COMPACT ENGINE WITH CRANKSHAFTS ROTATING ON A DIFFERENT PLANT TO THOSE OF THE CYLINDER AXES

CROSS-REFERENCE TO RELATED APPLICATIONS

This application relies on and claims the benefit of the filing date of U.S. provisional patent application No. 62/297,970, filed 22 Feb. 2016, the entire disclosure of which is hereby incorporated herein by reference.

FIELD OF THE INVENTION

This invention relates to the field of internal combustion engines. More specifically it relates to opposed-piston engines, and in particular, opposed-piston engines having a relatively compact size and low weight as compared to those currently known in the art.

GENERAL SUMMARY OF THE INVENTION

To briefly describe the characteristics encompassed by this invention, disclosed is an engine that allows for the reduction of traditional sizes of opposed-piston engines, which uses a configuration that has the rotational axes of the crankshafts to be out of the plane of the long axis of a cylinder or the plane of the long axes of two or more cylinders. The engine can be any internal combustion engine, including, but not limited to one that runs on gasoline, one that runs on diesel, one that runs on an alcohol (e.g., ethanol, methanol), or combinations thereof.

In embodiments, the invention dispenses with the need for an external compressor, e.g., a volumetric compressor, supercharger, or turbocharger, because the design includes, in embodiments, an embedded compressor chamber through a new piston and cylinder combination. The engine enables the performance of the entire typical thermodynamic cycle of admission, compression, combustion, and exhaust, and a compression that meets the volumetric requirements, including exhaust gas sweeping and overload in the cylinder for each revolution, without imposing the need for advancement between the crankshafts and/or the pistons, although advancement may be included.

BRIEF DESCRIPTION OF THE DRAWINGS

The accompanying drawings, which are incorporated in and constitute a part of this specification, illustrate several embodiments of the invention, and together with the written description, serve to explain certain principles of the invention.

FIG. 3 is a front view of one embodiment of the invention, which shows that for the exhaust piston (6) of the bottom cylinder, the corresponding connecting rod has already moved 7° regarding the cylinder axis, while the intake piston (5) still needs to travel 11° for its connecting rod to be aligned with the cylinder axis. In this configuration, the exhaust piston of the engine was given 18° of advancement regarding the intake piston. Eventually, when the exhaust piston connecting rod has reached 9° past the cylinder axis, the intake piston connecting rod will be 9° before the cylinder axis, the moment of maximum possible compression in the cylinder will take place.

FIG. 14 is the operating sequence corresponding to crankshafts rotating in the same direction and descriptive of the top cylinder.

FIG. 17 shows the operating sequence for counter-rotary crankshafts, and indicates the chosen moments to show the operation of the top cylinder.

FIG. 19 shows that two crankshafts can be linked using two gears, which causes the crankshafts to be counter-rotary.

DETAILED DESCRIPTION OF VARIOUS EMBODIMENTS OF THE INVENTION

Figure 1:
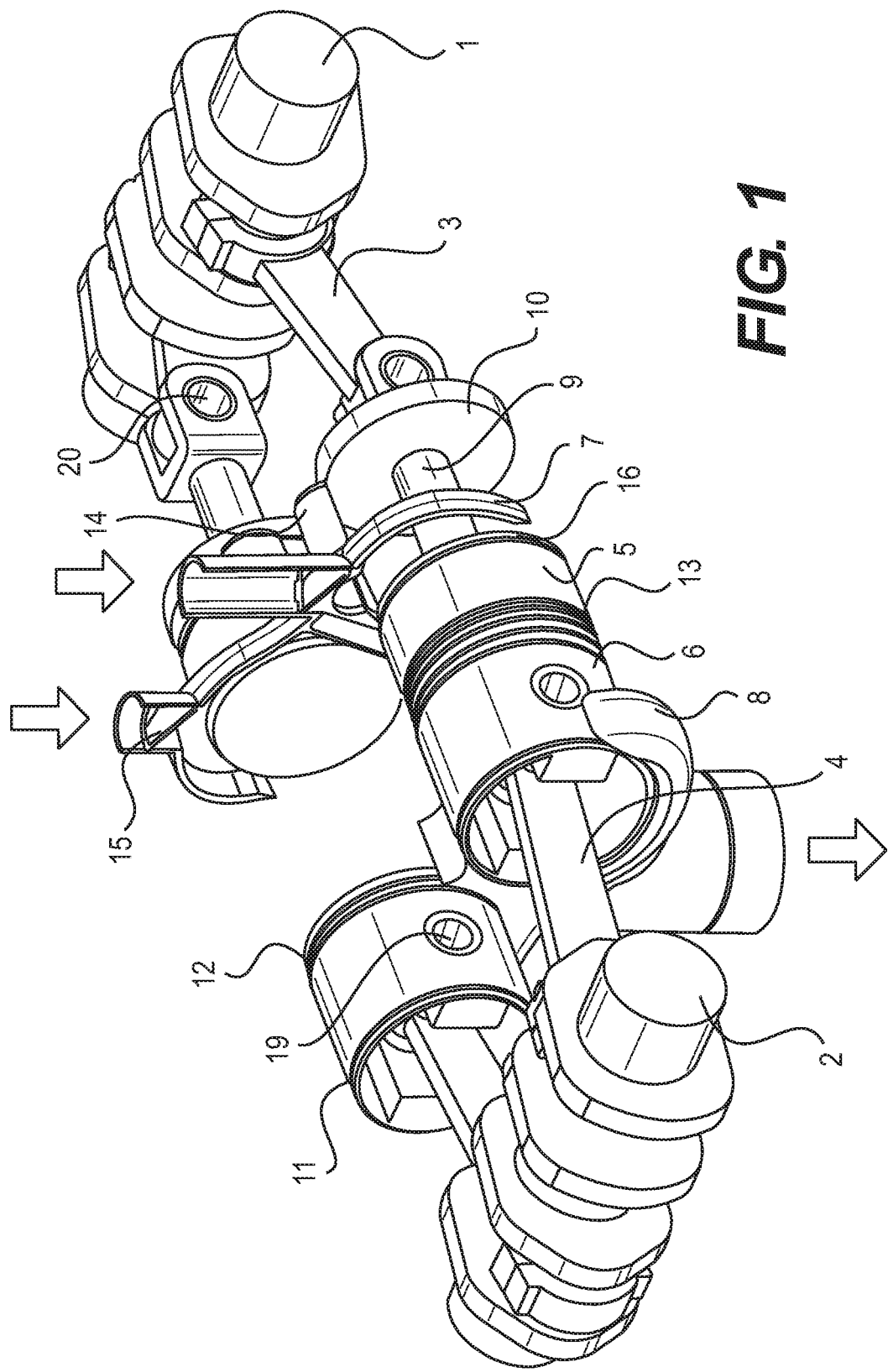
FIG. 1 shows a perspective view of an embodiment of the engine's functional assembly, without the cylinder block or the cylinders; with the intake crankshaft (1) and exhaust crankshaft (2), the short intake connecting rod (3) and the exhaust connecting rod (4), the intake piston (5) with its rigid stem (9) linked to the corresponding connecting rod (3) and set of rings (13) close to the piston head, with a possible compression ring in the skirt (16); the exhaust piston (6) with its double set of rings (11) and (12); the flapper (15) in the intake duct, and the compressor duct (14) that connects the embedded compressor chamber with the combustion chamber. The embedded compressor chamber is made up of the bottom part of the intake piston and the fixed disk (10) that performs as the stem's (9) guide, the exhaust piston pin (19), and the intake piston stem pin (20).
Figure 2:
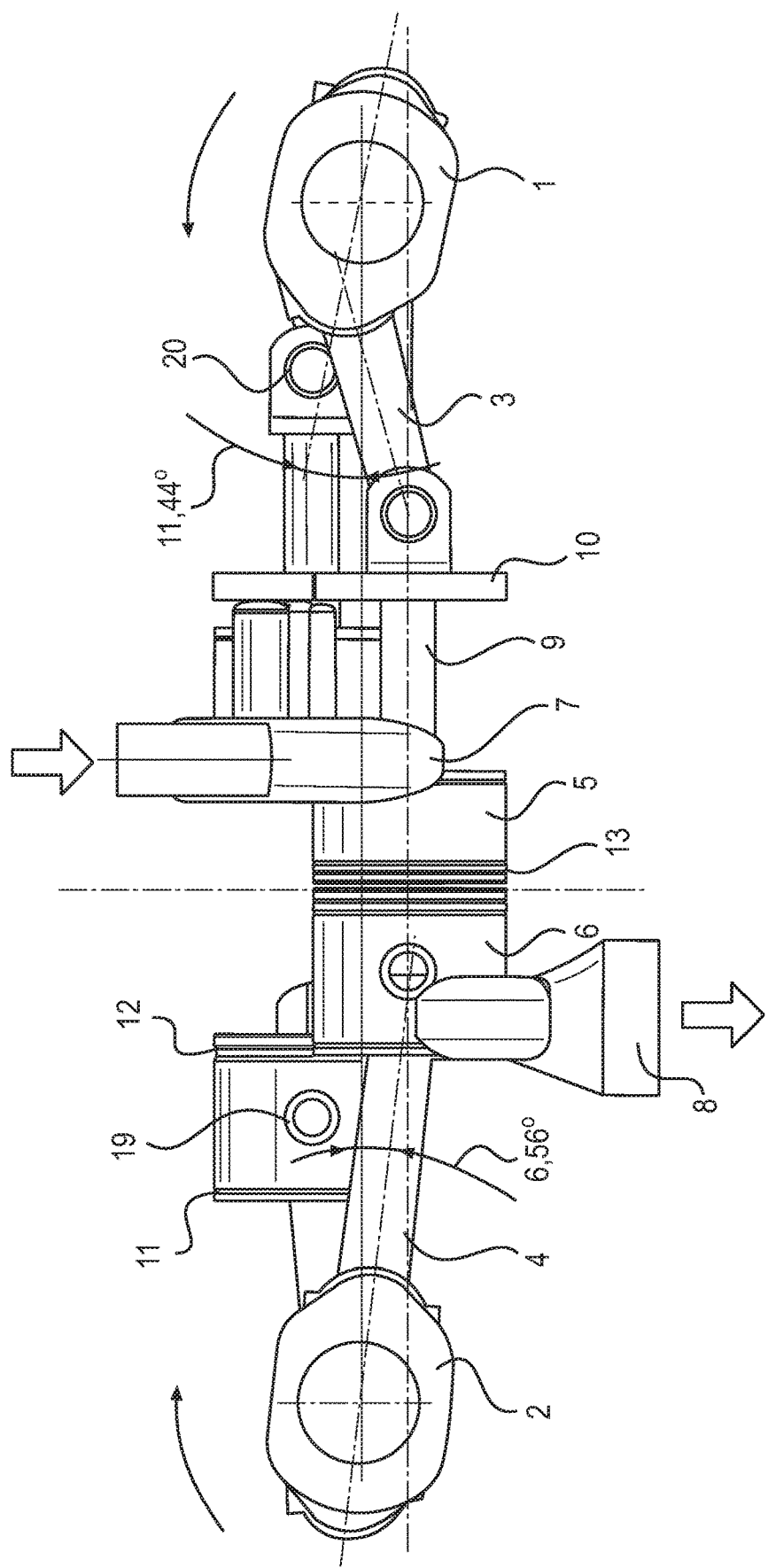
FIG. 2 is a side view of an embodiment of the engine's functional assembly, where the following can be viewed: the intake crankshaft (1), the exhaust crankshaft (2), the relatively short intake connecting rod (3), the exhaust connecting rod (4), the intake piston (5), the exhaust piston (6), the intake duct (7), the exhaust duct (8), the rigid stem (9) that binds the intake piston (5) with the intake connecting rod (3), the fixed disk (10), which guides the movement of the rigid rod (9), the set of exhaust skirt rings (11), the set of exhaust piston head rings (12), the set of intake head rings (13), the exhaust piston pin (19), and the stem pin (20). It can also be seen that the direction of rotation of both crankshafts is opposite or counter-rotary.
Figure 4A:
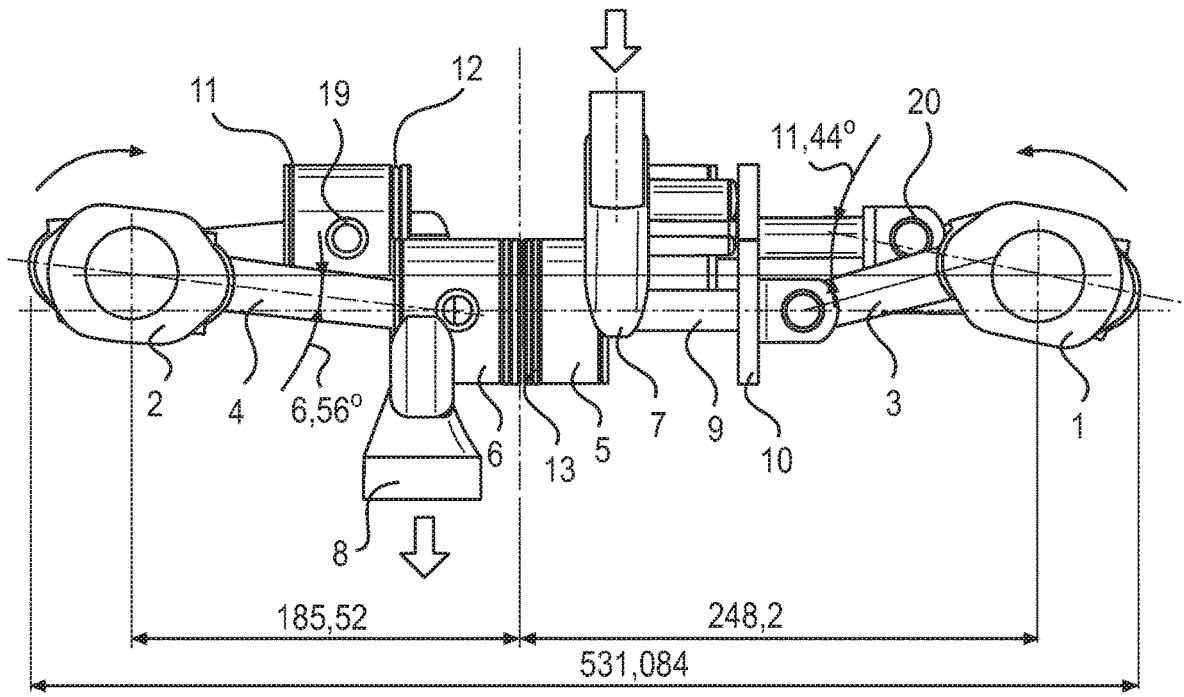
FIG. 4 shows an image, 4A, of a cylinder with an embedded compressor chamber which, for a specific configuration taken as a reference example, will have a longitude of 531 mm; while image 4B shows a longitude of 469 mm without the embedded compressor chamber.
Figure 4B:
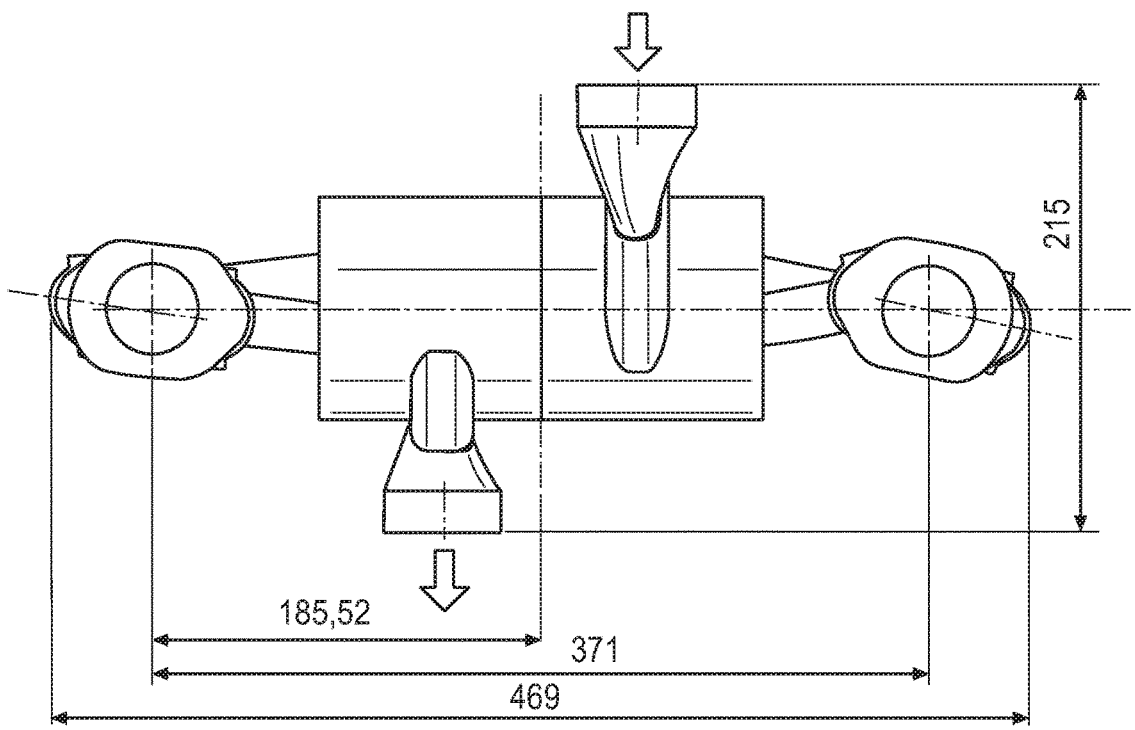
Figure 5A:
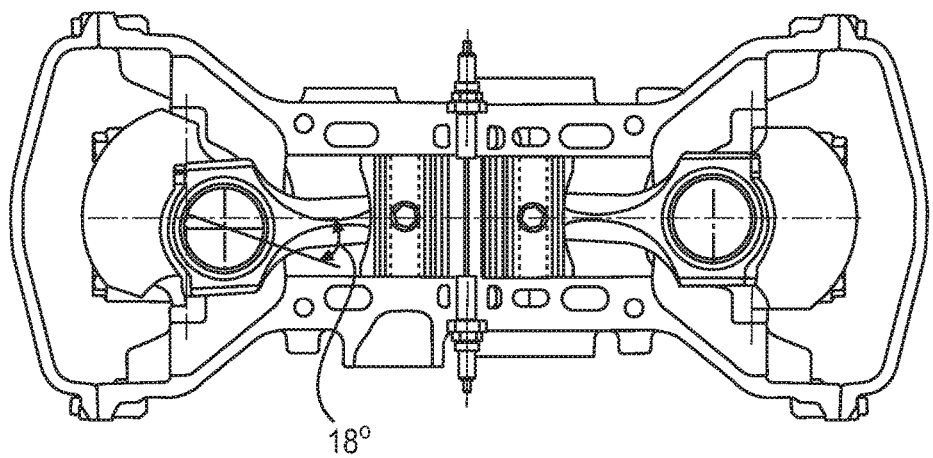
FIG. 5A shows an opposed-piston engine cylinder according to the status of the previous art, with the crankshafts aligned with the cylinder axis. As is evident from the Figure, even if the number of cylinders changes, all of their axes will be in the same plane as the rotation axes of the crankshafts.
Figure 5B:
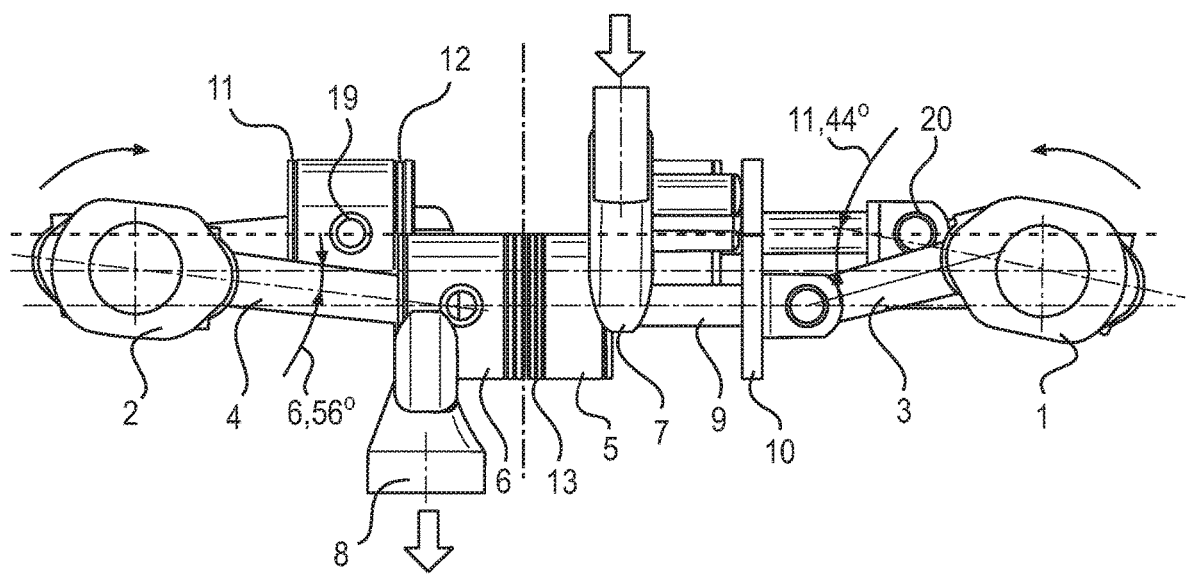
FIG. 5B shows the engine of an embodiment of the present invention, with crankshafts unaligned regarding the cylinder long axes, being that its cylinder long axes are in different planes.

Reference will now be made in detail to various exemplary embodiments of the invention. It is to be understood that the following discussion of exemplary embodiments is not intended as a limitation on the invention, as broadly disclosed herein. Rather, the following discussion is provided to give the reader a more detailed understanding of certain aspects and features of the invention.

Before embodiments of the present invention are described in detail, it is to be understood that the terminology used herein is for the purpose of describing particular embodiments only, and is not intended to be limiting. Unless defined otherwise, all technical and scientific terms used herein have the same meaning as commonly understood by one of ordinary skill in the art to which the term belongs. Although any methods and materials similar or equivalent to those described herein can be used in the practice of the present invention, the preferred methods and materials are now described.

As used herein and in the appended claims, the singular forms "a", "an", and "the" include plural referents unless the context clearly dictates otherwise. Thus, for example, reference to "a cylinder" includes a plurality of such cylinders and reference to "the intake piston" includes reference to one or more intake pistons, and so forth. Furthermore, the use of terms that can be described using equivalent terms include the use of those equivalent terms, as the context implies. For example, "top dead center" and "upper dead center" are equivalent terms, as are "bottom dead center" and "lower dead center", etc.

The present invention relates to an opposed-piston engine with piston heads facing each other, which is able to perform the whole thermodynamic cycle of overload admission, compression, combustion, and exhaust per each crankshaft revolution per cylinder.

In embodiments, with the assistance of an optional embedded compressor chamber, the engine is able to perform gas sweeping from a previous combustion event and an overload of air or an air and fuel mixture in one or each of two sides of a cylinder for every rotation of the crankshafts associated with that cylinder. Importantly, the compressor chamber is able to cover all the engine's volumetric requirements.

A novel mechanical arrangement that shortens the distance between the long cylinder axes in an embodiment of two or more cylinders leads to a considerable reduction in size by comparison with all the other previous opposed-piston engines known to the inventor.

In one embodiment relating to a two cylinder configuration of an engine of the invention, which can be extrapolated to a greater number of cylinders, there exists a long axis of a first cylinder, which runs from the terminus of the cylinder on one end (i.e., the point in space where the cylinder ends), to the terminus of the cylinder on the other end. To be clear, the axis runs down the center of the cylinder from one terminus to the other terminus. There also exists a long axis of a second cylinder, which similarly has two termini similar to the first cylinder. (And etcetera for embodiments comprising more than two cylinders.) According to embodiments of the invention described with specificity herein, the long axis of the first cylinder is preferably located the shortest possible distance from the long axis of the second cylinder, given mechanical, materials, and engineering constraints of the time of fabrication of the engine. In a preferred embodiment of the invention, the plane defined by the long axes of the two cylinders is an angle (e.g., 8°, 10°, 15°, 16°, 18°, 20°, 22°, 25°, 28°, 30°) that is not parallel to, perpendicular to, or coincident with a crankshaft's rotational axis, unlike traditional designs known in the art.

Figure 9:
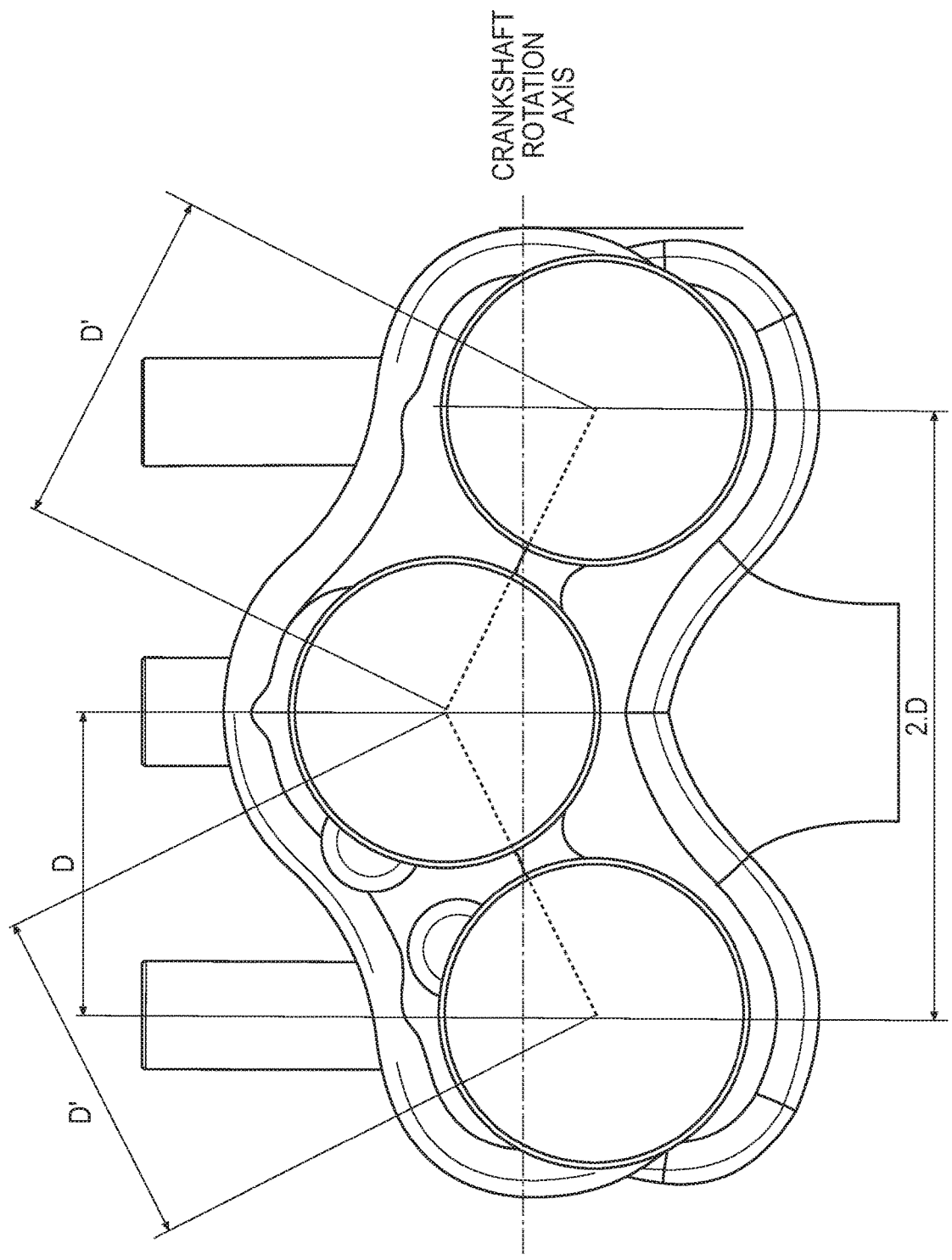
FIG. 9 shows a side view of a three-cylinder engine. It can be seen that the more cylinders the engine has while ducts are shared and the crankshaft's axes are displaced from the axes of the cylinders, size reduction will be increased. The figure shows that cylinders can share ducts, and that the crankshafts' axes are disengaged from the cylinders' axes. If the axes of the cylinders are connected by a straight line, two triangles are formed, where in each of them, D is one of the sides, and D' the hypotenuse. The greater the distance between the axis of rotation of the crankshafts and the cylinder axis, the smaller will be the horizontal projection of the hypotenuse D' and greater will be the size reduction in comparison with any engine whose crankshaft rotation axis is located in a plane passing through the axis of the cylinders.
Figure 10:
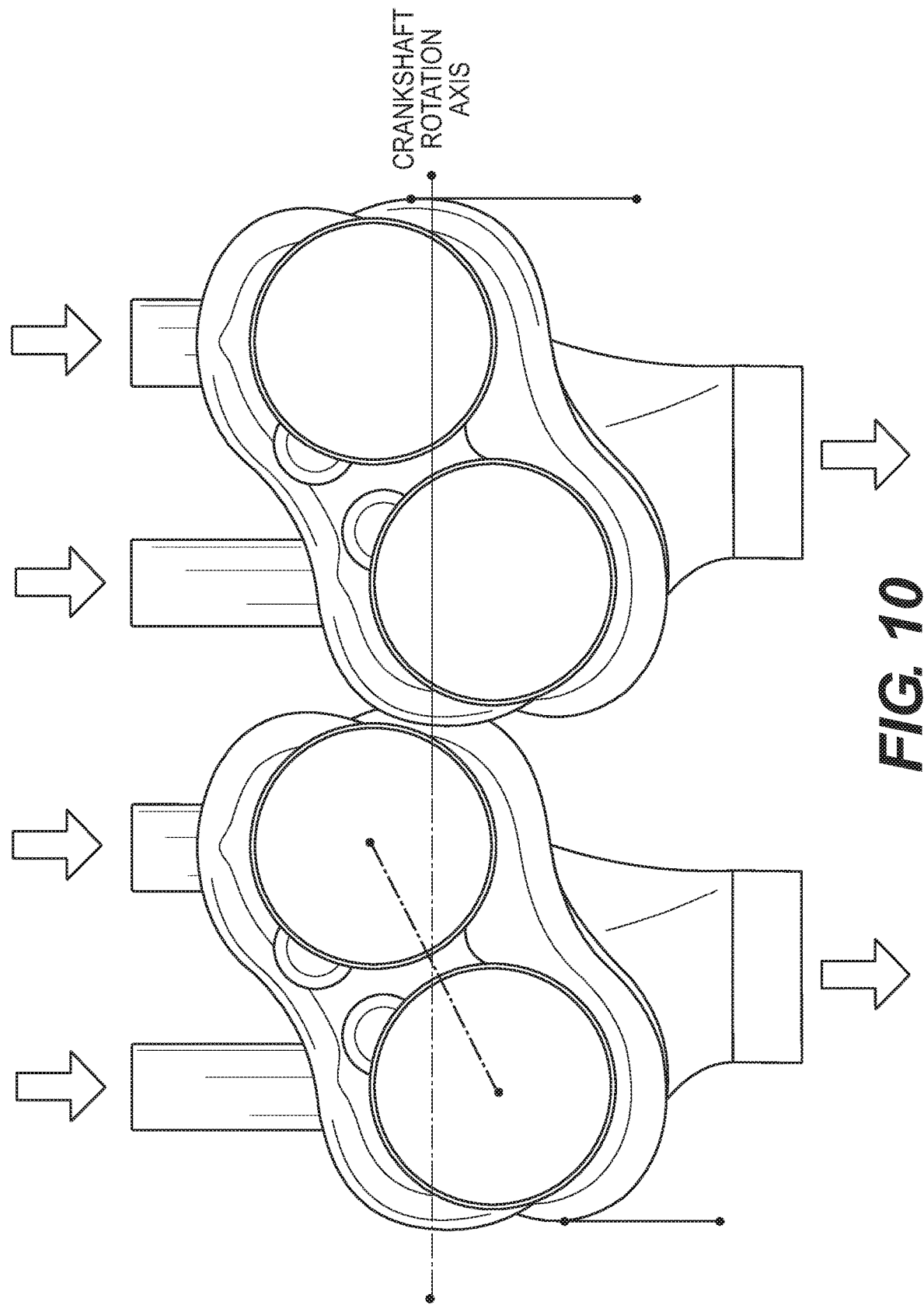
FIG. 10 displays a side view of a version with 4 cylinders, where the considerations for 2 and 3 cylinders remain the same.
Figure 11:
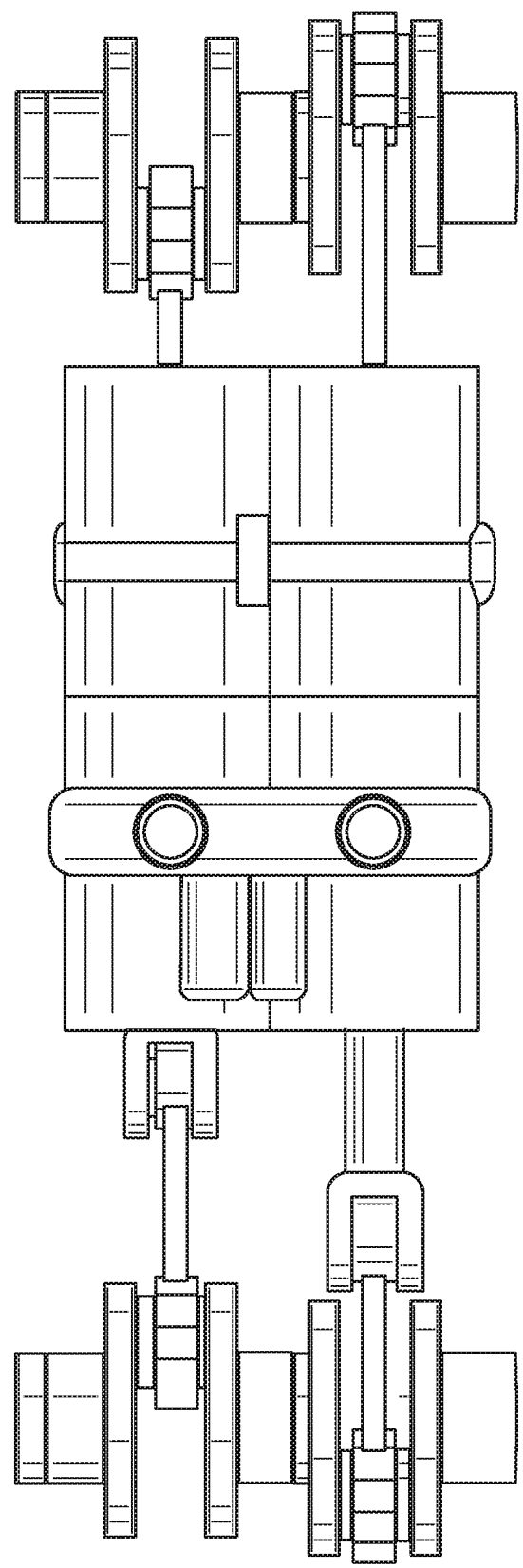
FIG. 11 is a top view of a 2-cylinder module with shared admission ducts, and preferably shared exhaust ducts (not shown).
Figure 12:
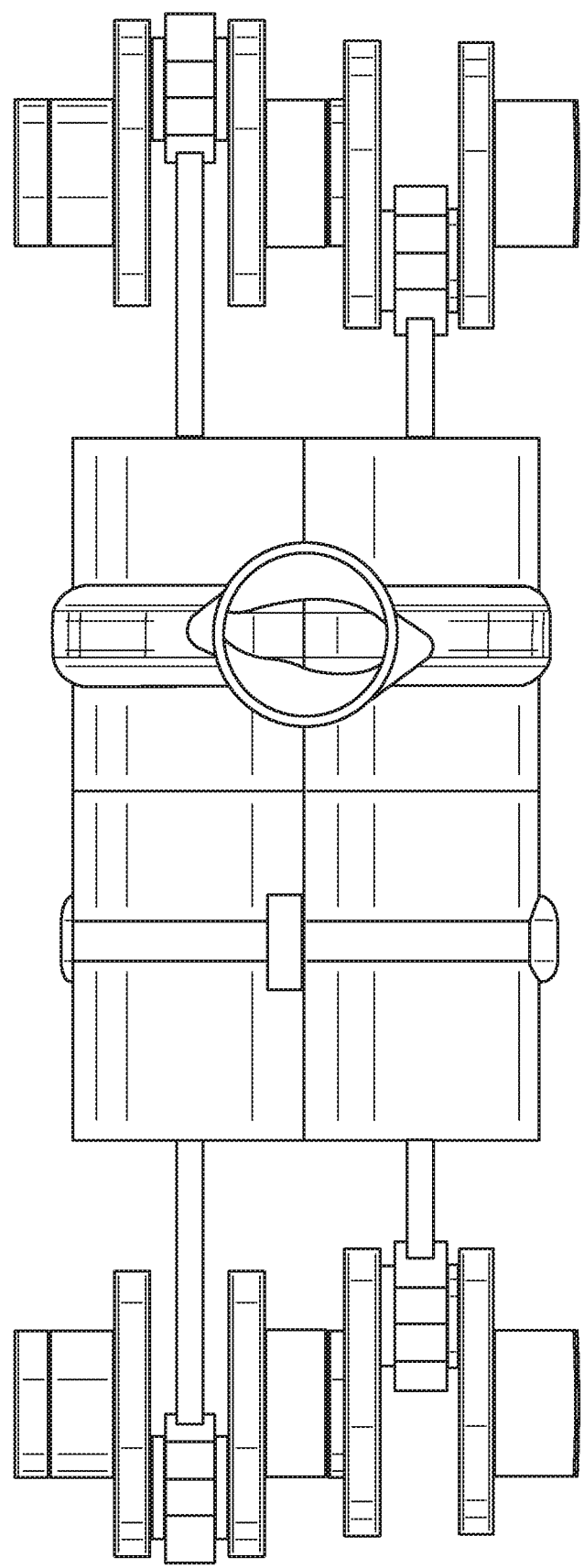
FIG. 12 is a bottom view of a 2-cylinder module which displays the exhaust shared ducts.
Figure 13:
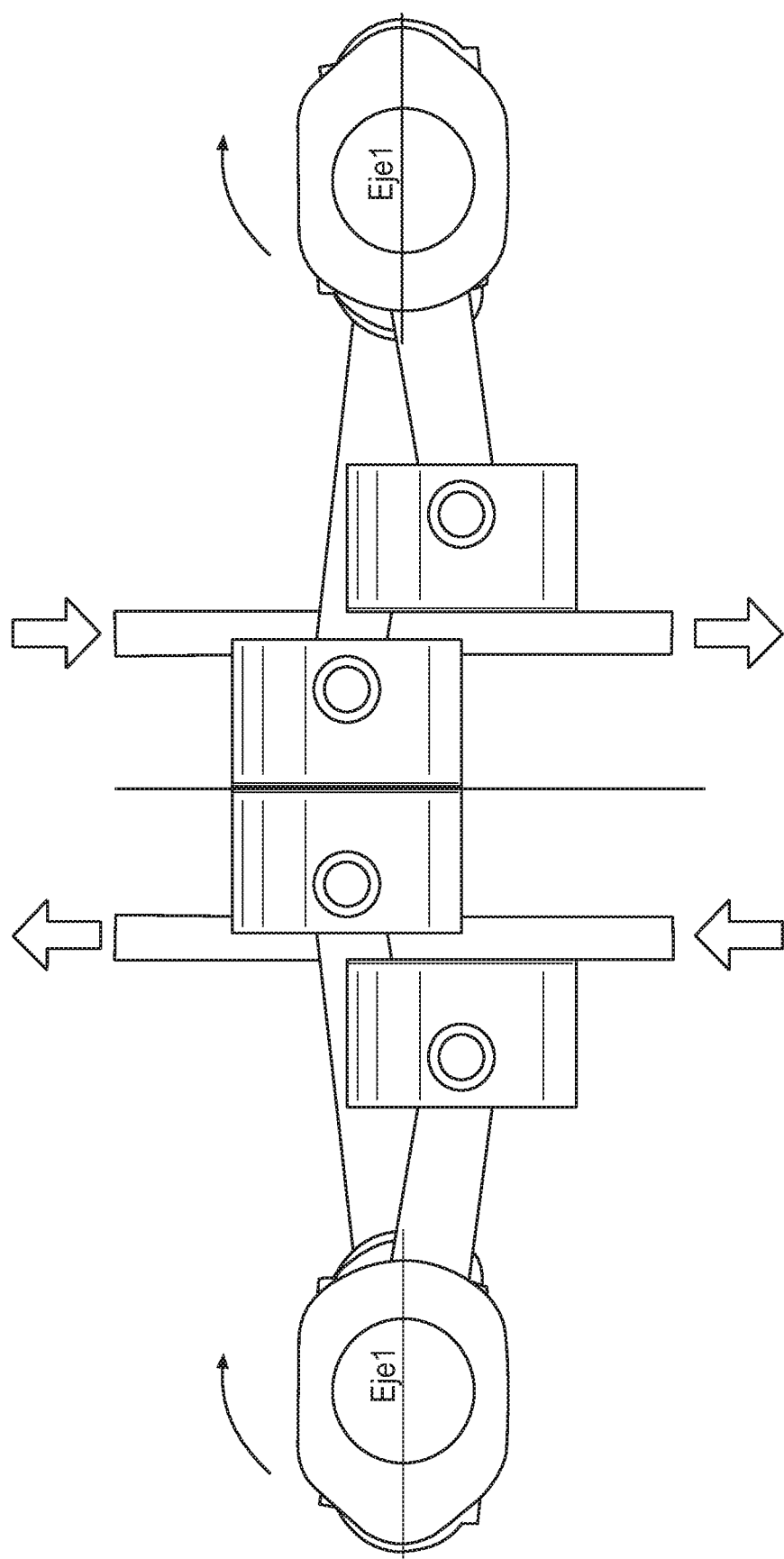
FIG. 13 shows the maximum compression point for the top cylinder with the crankshafts rotating in the same direction, where the left exhaust piston has passed through the upper dead center (UDC) while the right intake piston has not yet reached its UDC, despite not having imposed any advancement between the crankshafts. Such a situation occurs due to the displacement of the axis of rotation of the crankshafts, which are located in a different plane from the one containing the cylinder axes.

Although certain embodiments relate to other configurations, as described below, the crankshaft's rotational axis is preferably positioned at an average distance between the long cylinder axes of a selected first and second cylinder. In a three cylinder configuration or any other odd-numbered cylinder configurations, and following the same guidelines, the third cylinder (fifth cylinder, seventh cylinder, etc.) will preferably have its long axis in a same plane with the long axis of the first cylinder. FIG. 9 shows a configuration of the engine of the invention comprising three cylinders, where D' illustrates the distance between cylinder axes in the same plane, while D illustrates the shortest distance achieved to compact engine size. In a traditional three cylinder engine, the distance between first and third cylinder axis should be at least of D' times 2, resulting in D' clearly being larger than D. In the present invention's engine, the distance turns out to be D times 2 for the same 3 cylinders.

In embodiments, the present invention's engine uses, for the performance of intake (7) and exhaust (8), a shared duct structure that contributes to a reduction in size, and an optimization of the use of the shared ducts alternatively by different cylinders.

In embodiments, the present invention's working process is as follows: in each cylinder, each exhaust piston (6), for each combustion, pushes back its corresponding connecting rod (4), actuating the crankshaft's rotation (2) and opening and closing the exhaust ports (8) present in that cylinder, which are openings or ports in the cylinder's wall connected to a shared exhaust structure or duct (8) with one or another cylinder. For such purpose, it has at least one compression ring and one oil ring in its skirt (11), in whose slot the piston has holes that allow the ring to do an efficient sweeping of the skirt wall's oil.

The dimensions of the exhaust piston (6) are such that they allow that, in the moment of maximum compression, the set of upper rings and the set of lower rings form a sealed chamber independent from both the crankcase and the combustion chamber. The sealed chamber encompasses the exhaust ports and eliminates or substantially minimizes flow of combustion gases to the exhaust ports. The dimensions of the exhaust piston (6) are such that they allow that, in the moment of maximum compression, the set of upper rings and the set of lower rings form a sealed chamber independent from both the crankcase and the combustion chamber. The sealed chamber encompasses the exhaust ports and eliminates or substantially minimizes flow of combustion gases to the exhaust ports.

In embodiments, the exhaust piston has the structure described above. I other embodiments, the intake piston has the structure described above. In yet other embodiments, both pistons have the structure described above.

As mentioned above, the invention includes a configuration in which one or more cylinders of an engine includes an embedded compressor chamber. In such embodiments, one or both of the pistons within a cylinder are modified to provide an assist, or to completely replace an external overpressure device, such as a blower or supercharger. In these embodiments, one or both of the pistons are designed and fabricated in combination with the cylinder to provide an embedded compressor chamber. In exemplary embodiments, the embedded compression chamber is implemented on the intake side of the cylinder using a modified intake piston. However, alternatively or in addition, the exhaust piston may comprise similar or equivalent elements to provide an embedded compressor chamber in the exhaust side of the cylinder.

The concept of the embedded compressor chamber is depicted in FIGS. 1, 2, 4A, 5B, 6A and 6B, 11, 26, and 27, for example. As an illustrative example of an embodiment of this concept, two pistons are present in a single cylinder. The second piston is the intake piston (5) which does not require retention oil rings in its skirt, it has no pin, and its lower face is blind, i.e., solid (see FIG. 6B) and joined to a rigid stem (9), which is preferably of a cylindrical shape. The rigid stem (or rod) transmits the impulse generated by the combustion of fuel towards the connecting rod (3) that is joined to the rigid stem by a pin or any other connecting means, and connects the intake piston (5) to the corresponding crankshaft (1).

Figure 6A:
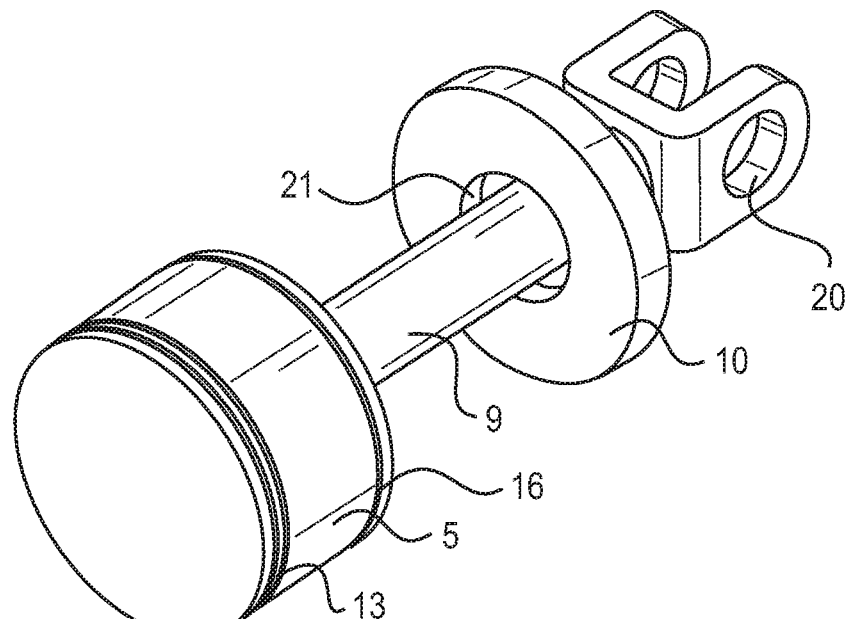
FIG. 6A shows a view of the front perspective of an embodiment of the components of the embedded chamber, which displays the following: the admission piston (5), having top compression rings (13) and bottom compression ring (16), the piston being bound to the stem (9). The figure also shows the fixed disk (10), location for seal (21), which prevents compression loss or the entry of oil into the chamber, and the anchoring location of the pin stem (20).
Figure 6B:
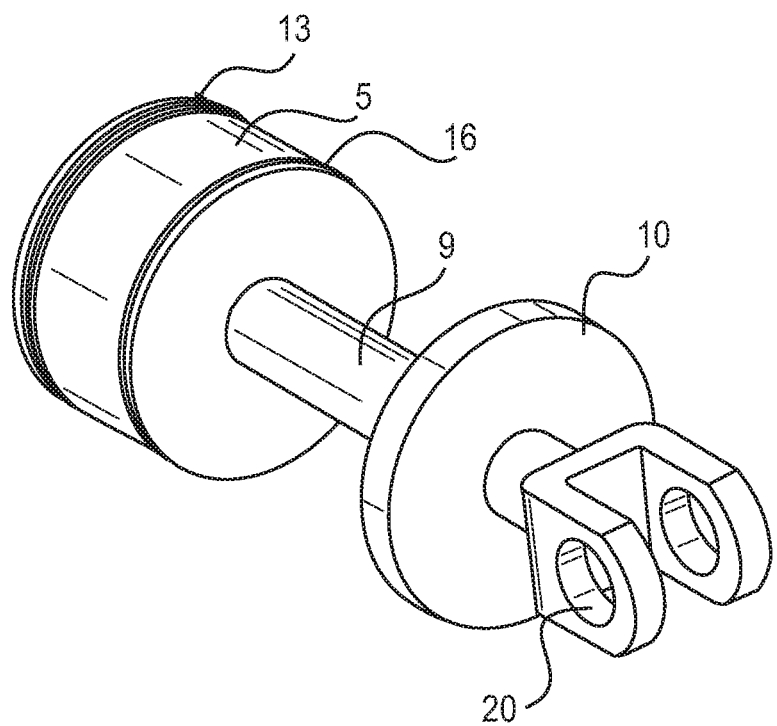
FIG. 6B shows a rear perspective view of FIG. 6A, which displays the same elements, and where the bottom, non-hollow surface of the intake piston can be seen.
Figure 7:
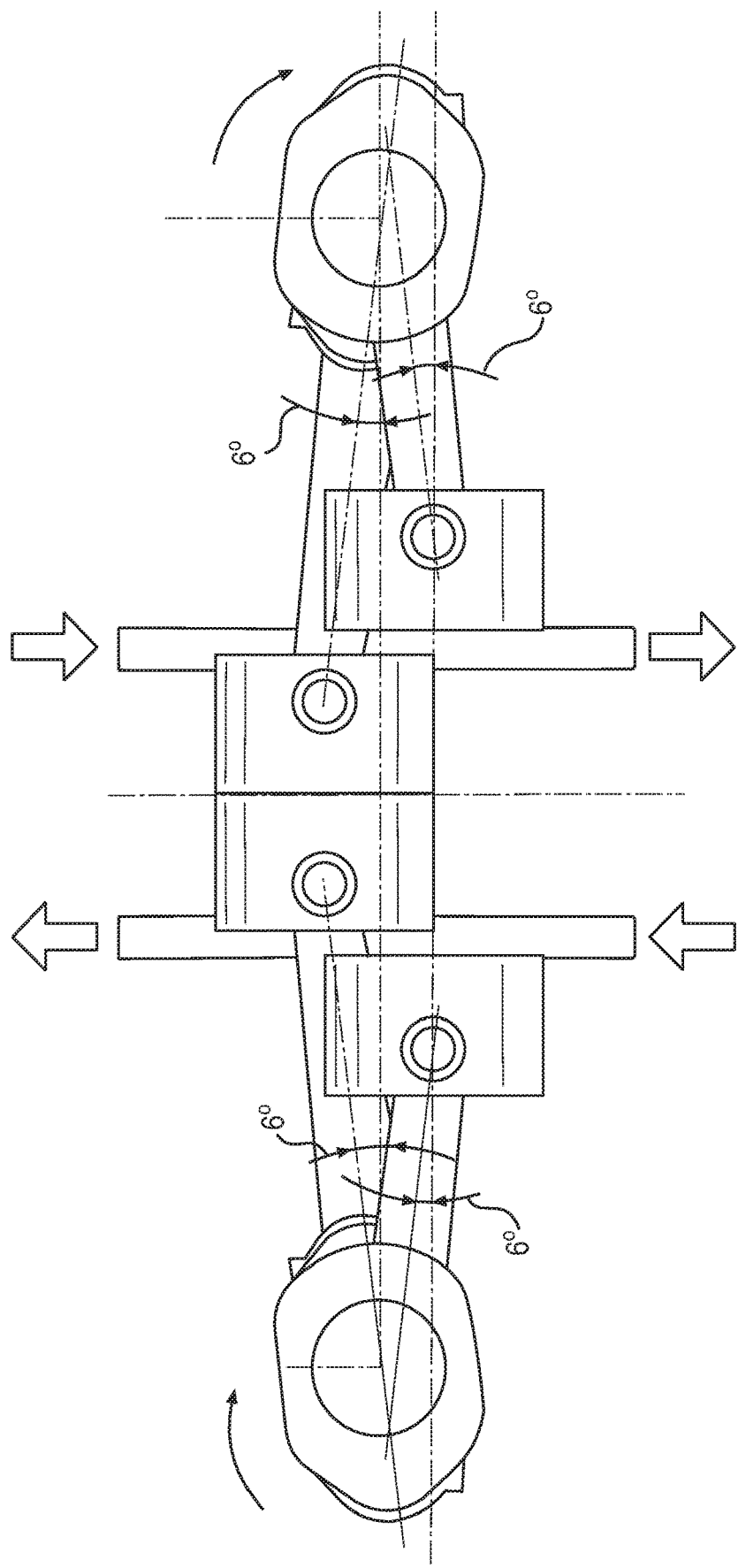
FIG. 7 shows a front-view version of an embodiment of the invention where crankshafts are rotating in the same direction, without imposing the need of advancement between pistons or crankshafts. As can be seen, while the left exhaust piston of the top cylinder is in interior dead center, 6° before the corresponding connecting rod aligns with a parallel plane to the cylinder axis, the right intake piston of the top cylinder has already surpassed 6° regarding a parallel plane to the cylinder axis. In that same moment of rotation, in the bottom cylinder, the intake and exhaust ports are located counter to the top cylinder by design, so that the exhaust piston can reach the internal or external dead center before the intake piston, when the intake piston is still remaining 6° to reach its internal or external dead center.

For volumetric self-sufficient embodiments, between the intake piston (5) and its corresponding connecting rod (3) (see FIG. 5B), an embedded compressor chamber can be integrated into one or more cylinders (FIG. 6A, 6B; compressor chamber is formed between piston (5) lower face and fixed disk (10) and cylinder wall, not depicted in FIG. 6A or 6B for clarity). The function of the compressor chamber is to provide the volumetric requirements of at least one cylinder by forcing air, using the movement of the piston relative to the fixed disk, from the compressor chamber to the combustion chamber. The dimensions of the compression chamber are not limited by the diameter of the cylinder and could be larger to it, and both its diameter and height are defined by calculating the volume requirement of the cylinder, preferably by only one per cylinder in the intake zone. The compression chamber can also be set up to be applied in the exhaust zone, driven by the corresponding exhaust piston (6), in which case, the chamber will be isolated from the exhaust gases, aspirating from the intake and directing the compressed gases towards the combustion chamber.

The engine can be arranged with a compressor chamber in the intake zone and another one in the exhaust zone, which, in that case, will have a similar configuration to the one detailed for the intake piston (5). It should be understood that the decision of the number of chambers and the dimensions will depend on each cylinder's volumetric requirement and of the engine as a whole. As mentioned above, the compressor chamber (see FIG. 6A, 6B), is formed between the piston's lower flat and blind face, the rigid stem (9), and a fixed disk (10) anchored by any suitable means at the end of the cylinder. The fixed disk (10) has a hole in its central area that allows the free displacement of the rigid stem (9) (i.e., allow a portion of the rigid stem to traverse or pass through the hole as the piston moves back and forth within the cylinder). Along the displacement, the least possible friction is achieved by the use of bearings or similar elements, such as a hub, bushing, or O-ring located in the central hole. A gasket seal to impede the leak of the air pressure from the upper part of the fixed disk (10) may also be applied, and a double gasket seal may perform both functions. Those of skill in the art will recognize that any other means that impedes the leak of air that compresses and the access of oil towards the chamber can be used.

In embodiments, the chamber (see FIG. 6A, 6B) is connected to its respective intake structure (7) by means of a duct (14), whereby air or the mixture of air and fuel will circulate to and from the intake structure (7). When the intake piston (5) is on its downward motion, pushed by the expansion of the combustion gases, the piston shall not only move the crankshaft (1), but it shall also compress the air previously allowed to enter into the compressor chamber. In the course of its downward motion toward the crankshaft, the compressed air shall be sent through the duct (14) and the corresponding intake structure (7), preferably to the combustion chamber of its own cylinder, thus generating favorable conditions for the next combustion, once the air and fuel conditions under pressure are met, with the assistance of a spark or through compression alone, whether in systems of indirect injection, with all their known variances, or of direct injection of gasoline, diesel, or any other fuel, or in any other form of injection and/or combustion, in order to start again with the thermodynamic cycle process. In the cycle, once both pistons (5), (6) complete their movement towards their respective bottom dead centers (BDC), the exhaust piston shall open first its respective exhaust ports, and thus the exhaust duct structure (8), while the intake ports are still closed. At this time, the compression chamber, once the blind lower face of the intake piston (5) has blocked the intake port (7), starts compressing air for the next combustion. Once the admission port (7) is opened, the cylinder pressure is lower than the one supplied by the intake duct structure. Therefore, intake flow is sent towards the cylinder. Thus, while both exhaust and intake ports remain open, gases remaining from the previous combustion event are swept out, and the cylinder is filled with new air or an air and fuel mixture. Once the exhaust piston (6) has closed its respective port(s) and the intake port(s) remains open, overloading of air or air and fuel in the cylinder occurs, preparing the conditions for the next combustion event.

Once the intake piston (5) reaches its BDC, its capacity to send air towards the cylinder is null, and when the intake piston (5) commences its upward movement, the chamber load process through the intake duct structure (7) is repeated. It is possible to add a volumetric compressor and/or an exhaust turbo to the engine, which shall use the remaining energy in the velocity of exhaust gases to move the exhaust turbine, and to provide positive pressure to the intake duct structure, which, if it is greater than the internal pressure of the compression chamber in its upward motion, shall provide a helping impulse to the intake piston (5), recovering part of the energy used to compress the chamber in its upward motion, or potentially all of the energy, depending on the rpm regime of the engine, and the capacity of the compressor applied.

Of course, as mentioned to above, an engine according to the invention can include a compressor chamber system within the context of an exhaust piston as well as, or in addition to, an intake piston. Such a system or configuration could improve not only compression/overpressure within the combustion chamber, but also fuel efficiency by igniting/burning unspent fuel from previous combustion events.

Figure 8:
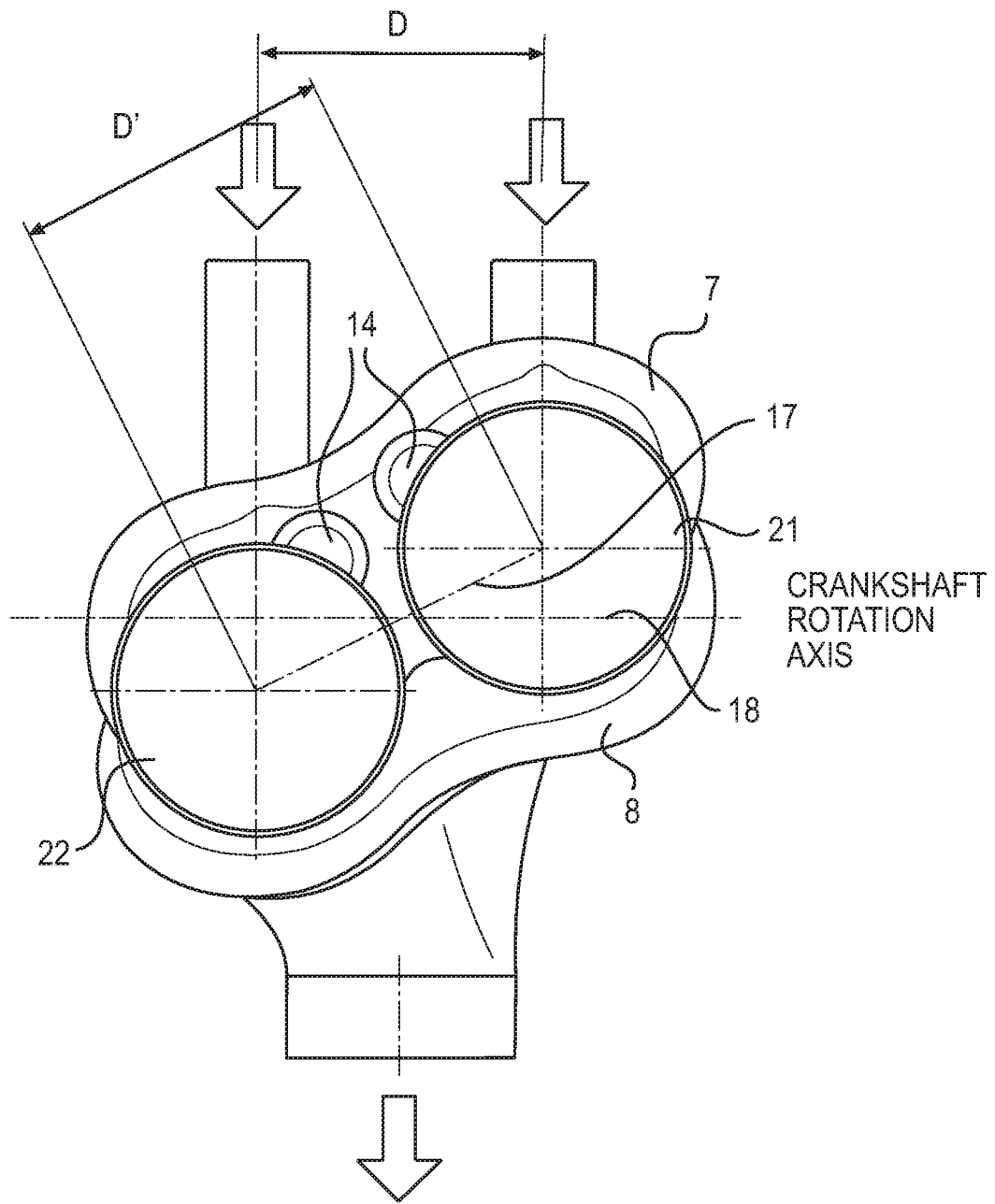
FIG. 8 shows a side view of two cylinders which display a bi-cylindrical configuration, with a top cylinder (21) and a bottom cylinder (22), a shared intake duct (7), a shared exhaust duct (8), connecting ducts between the compressor chamber and the cylinder (14), in which the distance between the cylinder centers (D') and a horizontal projection of the distance between the cylinders (D), where it can be seen that the use of shared ducts and the horizontal projection of the distance between the cylinders generates a reduction in the horizontal size of the engine.

In embodiments, the intake duct structure (7), when the engine applies an embedded compressor chamber, includes at least one flapper-type valve (15) or any other means that prevents flow of air provided by the compressor chamber towards the intake manifold instead of towards the cylinder in situations where the pressure generated by the compressor chamber is greater than the pressure present in the intake manifold. If no compressor chamber is installed, and the engine is provided with an intake compressor (e.g., a blower, etc. connected to an intake manifold), the intake piston may have a similar design to that indicated for the exhaust piston (6). The crankshafts (1), (2) of the invention, which are located in a different plane from the axes of the cylinders (17), have their rotary axes (18) at a plane that does not contain, include, or match, the long cylinder axes (17). The preferred placing of the rotary axes of the crankshafts in embodiments is in a plane located half-way between the parallel horizontal planes that contain the long cylinder axes (see FIG. 8).

The thermodynamic cycle that allows the cylinder overload requires that the exhaust port is opened before the intake port. According to embodiments of the present invention, this precedent condition is allowed through the displacement of the rotating axes of the crankshafts from the long axes of the cylinders and, in embodiments, the rotation of crankshafts in the same direction, without need of imposing advancement on the piston or on crankshaft, although that mechanism of action is contemplated in other embodiments of the invention.

Figure 14A:
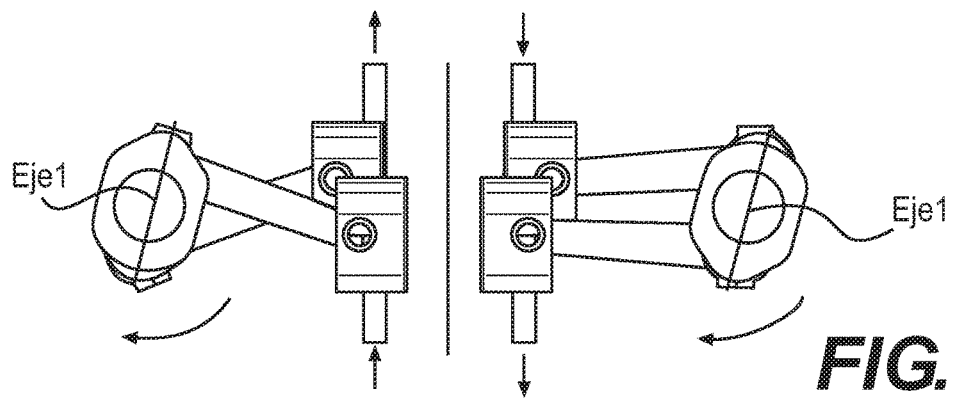
FIG. 14A shows the moment the exhaust ports are opened by the exhaust piston, while the intake ports remain closed.
Figure 14B:
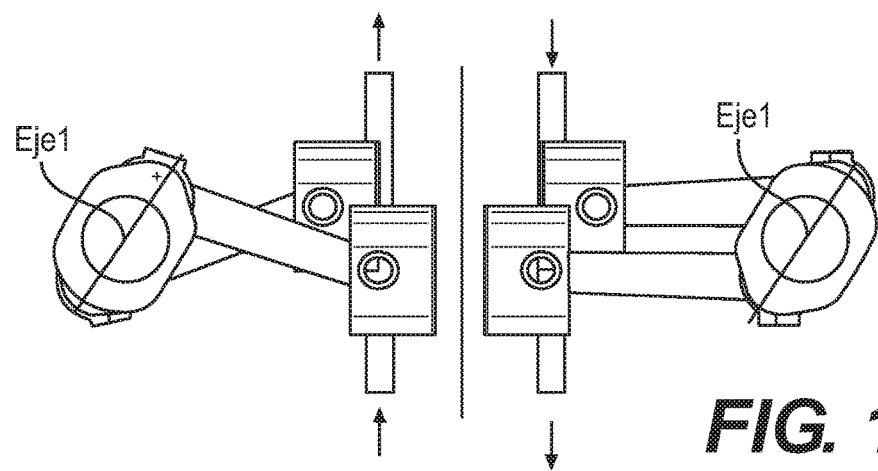
FIG. 14B shows the moment the intake ports are opened by the intake piston, permitting sweeping of the gas from the prior combustion.
Figure 14C:
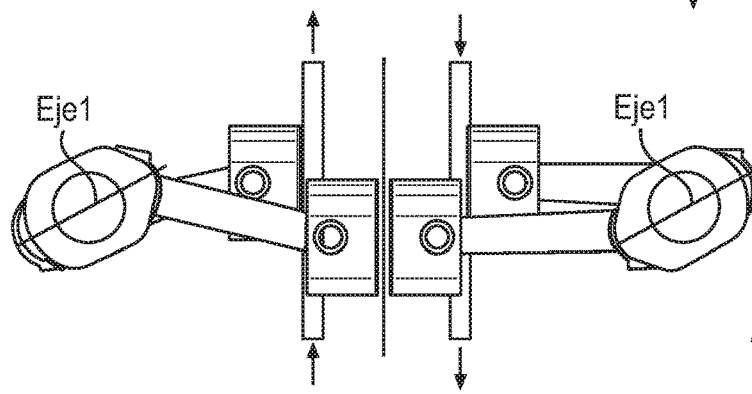
FIG. 14C shows the moment of starting of the maximum exhaust opening.
Figure 14D:
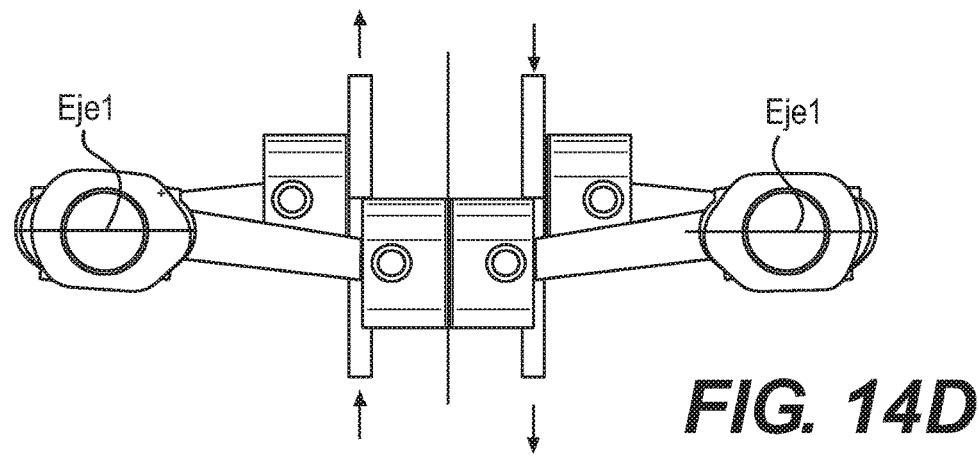
FIG. 14D shows the moment of maximum intake opening.
Figure 14E:
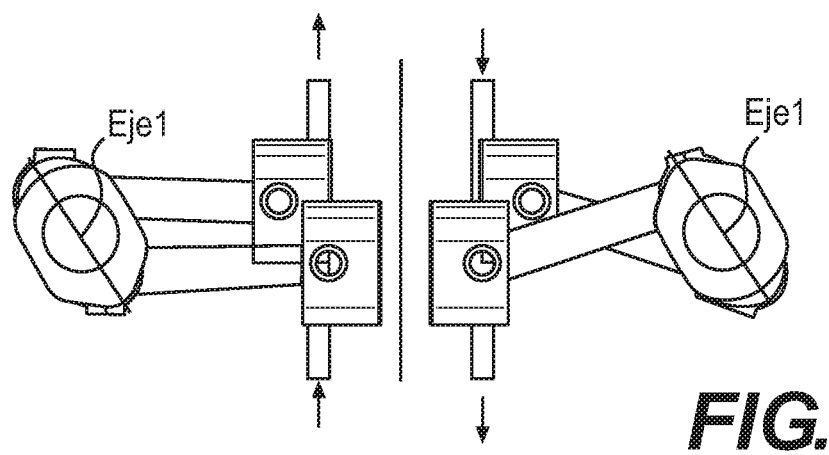
FIG. 14E shows the moment when the exhaust ports are closed while the intake ports are still open, to enable overload of air or an air and fuel mixture.
Figure 14F:
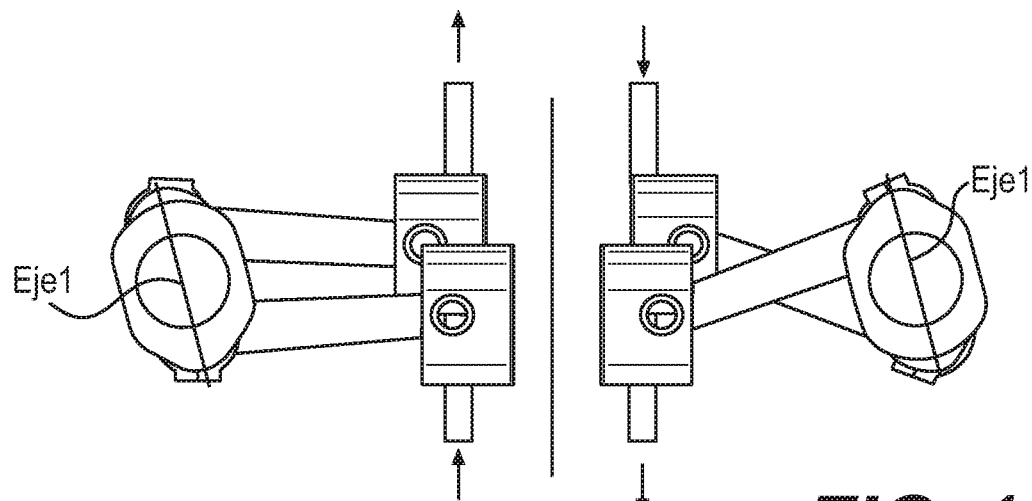
FIG. 14F shows the moment when the intake ports are closed and the start of full compression with both ports closed.
Figure 14G:
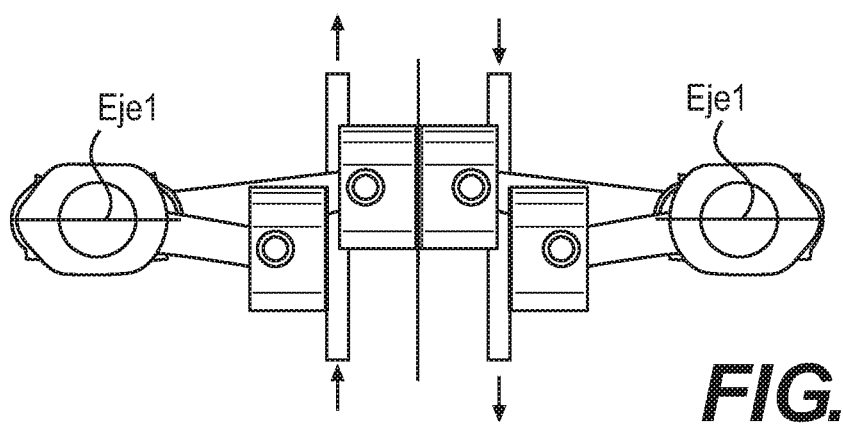
FIG. 14G shows the moment of maximum cylinder compression.
Figure 15A:
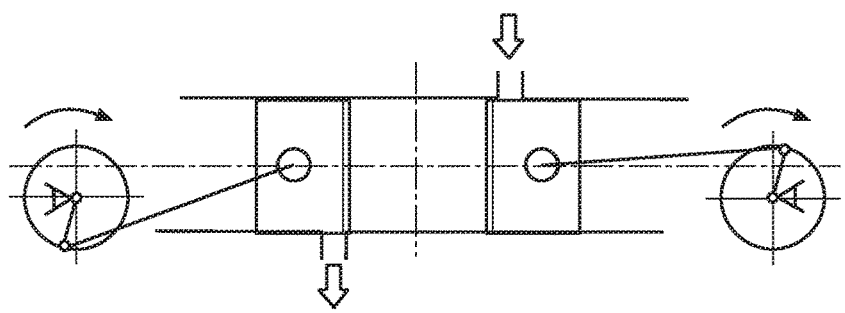
FIG. 15 is the operating sequence outlined for the images in FIG. 14.
Figure 15B:
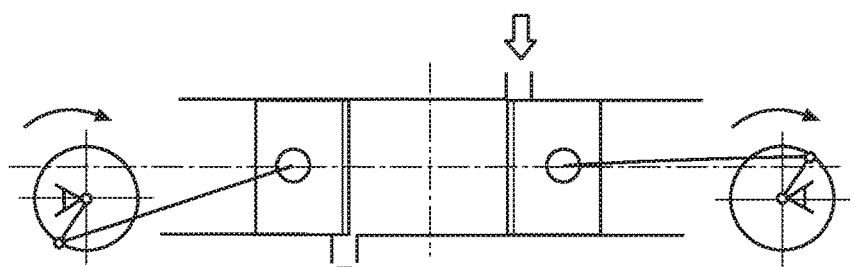
Figure 15C:
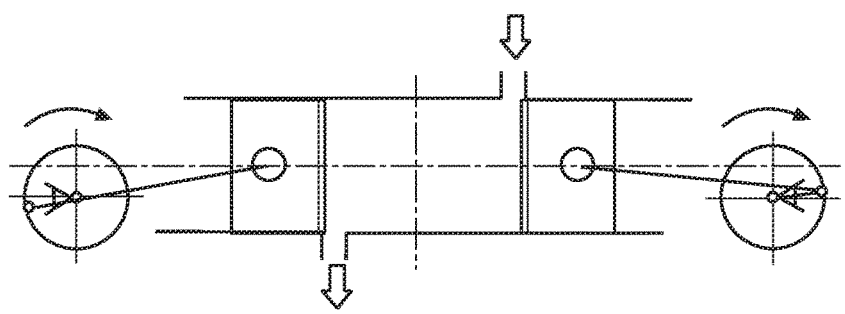
Figure 15D:
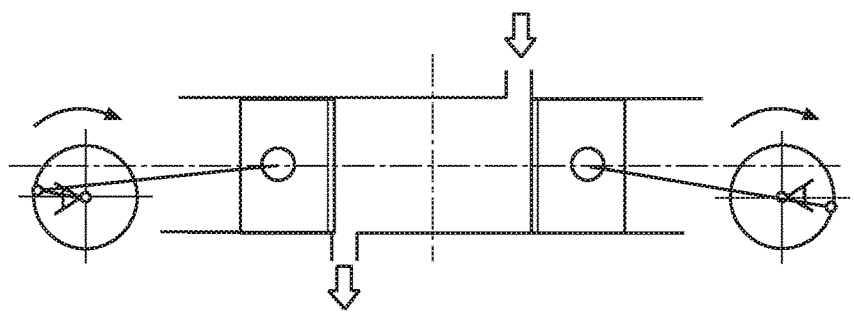
Figure 15E:
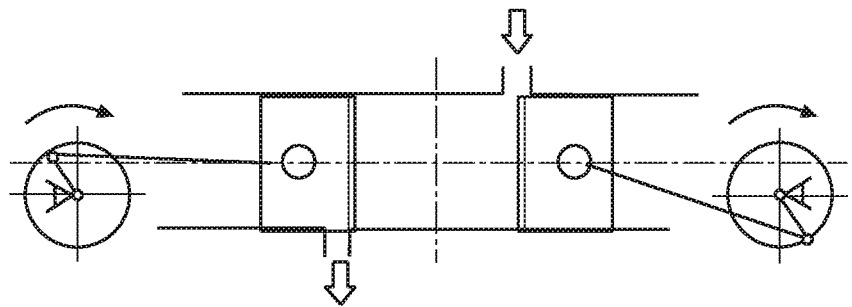
Figure 15F:
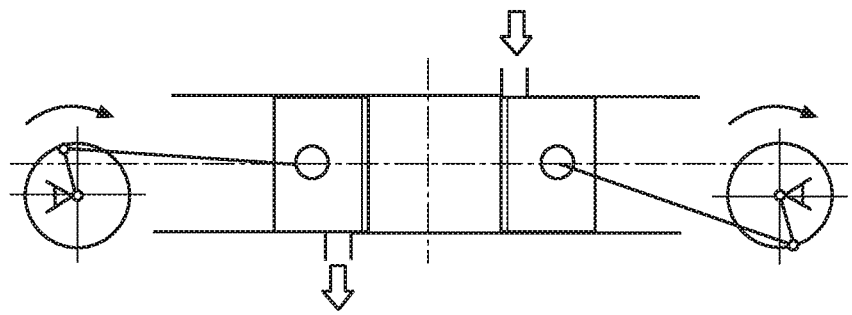
Figure 15G:
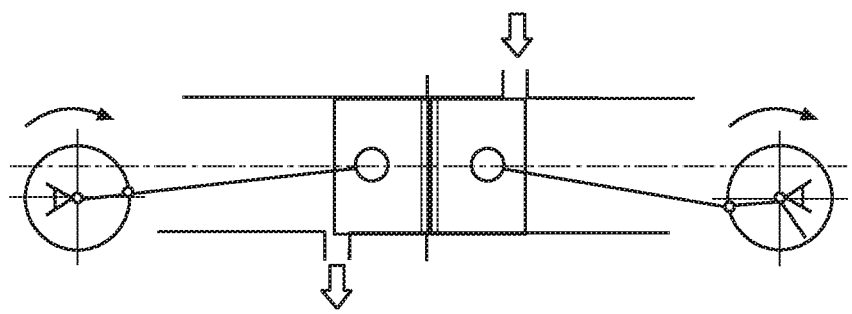
Figure 16:
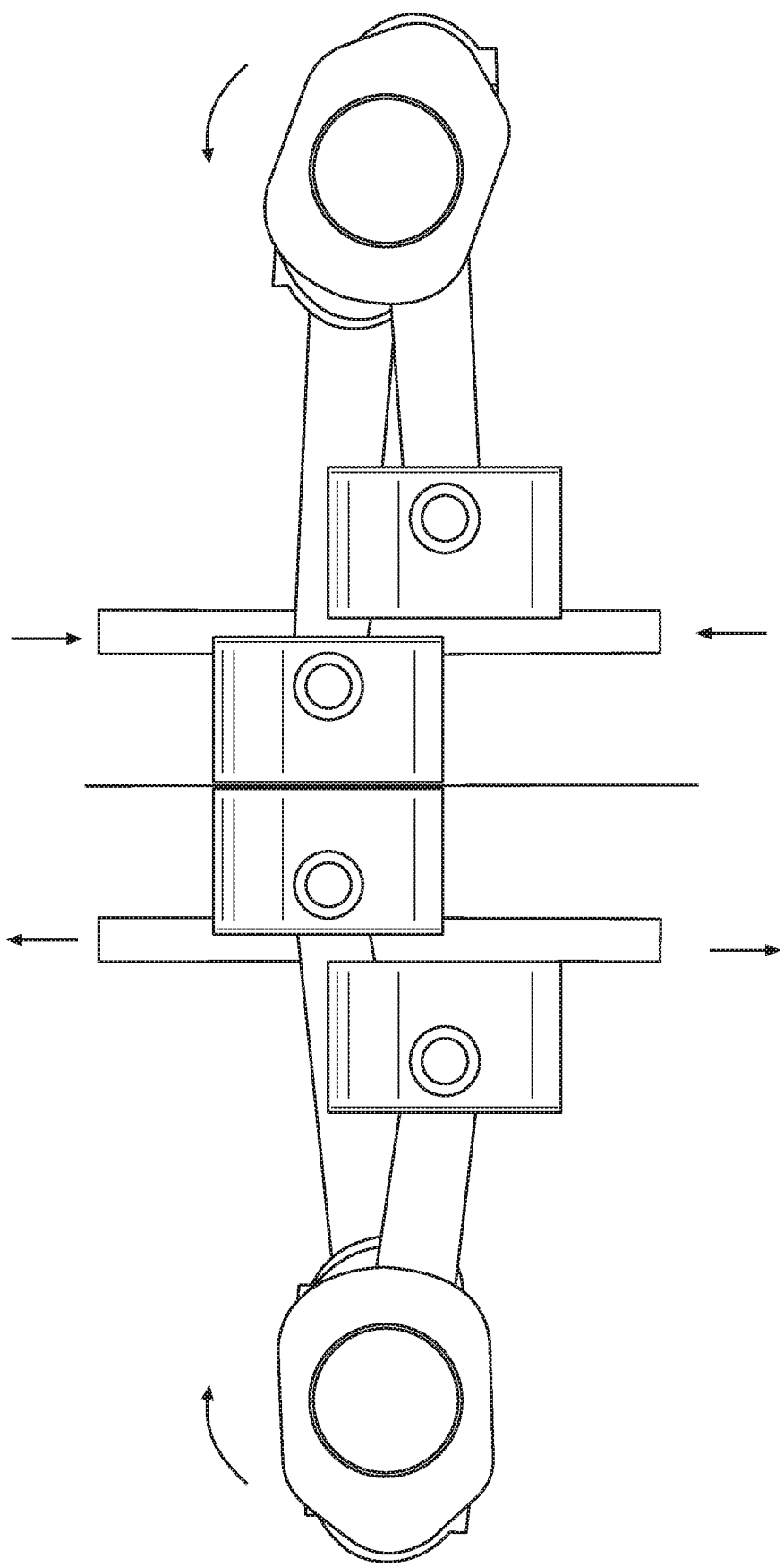
FIG. 16 shows an embodiment where the exhaust crankshaft rotates clockwise and the intake crankshaft rotates counter-clockwise. It can be observed how in the upper cylinder the exhaust piston reaches its top dead center (TDC) when the intake piston has not yet reached its TDC, due to an advancement imposed in order to comply with the operating cycle. At the same time, in the bottom cylinder the exhaust piston maintains advancement with respect the intake piston.
Figure 17A:
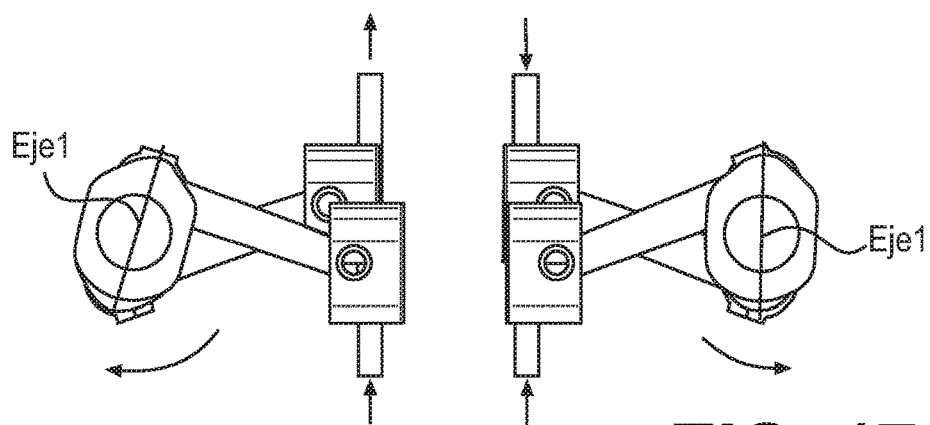
FIG. 17A shows the moment the exhaust ports are opened by their corresponding piston, thus initiating the exhaust time, while the intake ports remain closed.
Figure 17B:
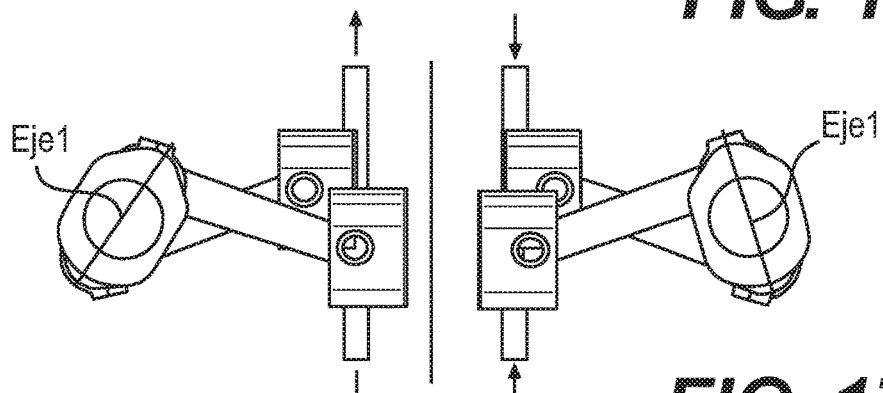
FIG. 17B shows the moment the intake ports are opened, while the exhaust ports remain open, thus initiating the cylinder sweeping.
Figure 17C:
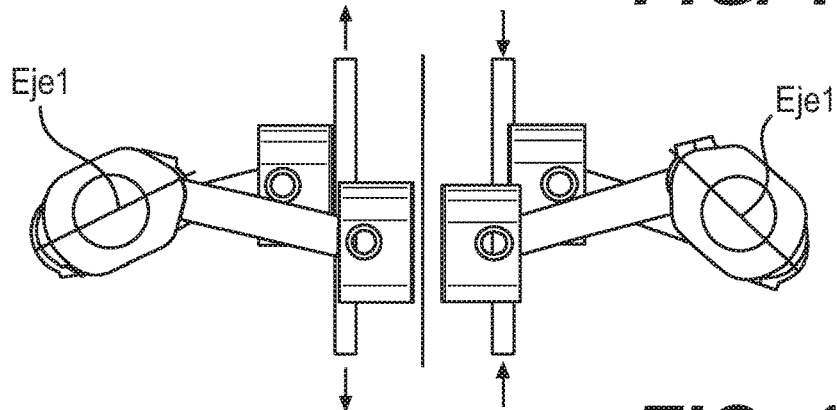
FIG. 17C shows the maximum exhaust opening moment.
Figure 17D:
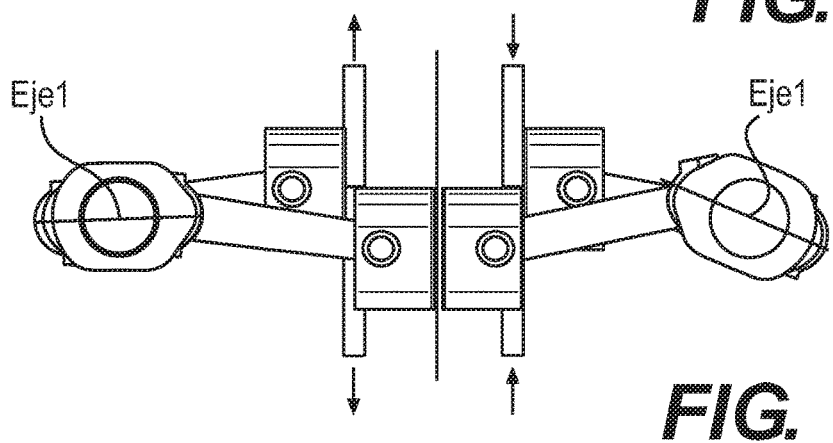
FIG. 17D shows the maximum intake opening moment.
Figure 17E:
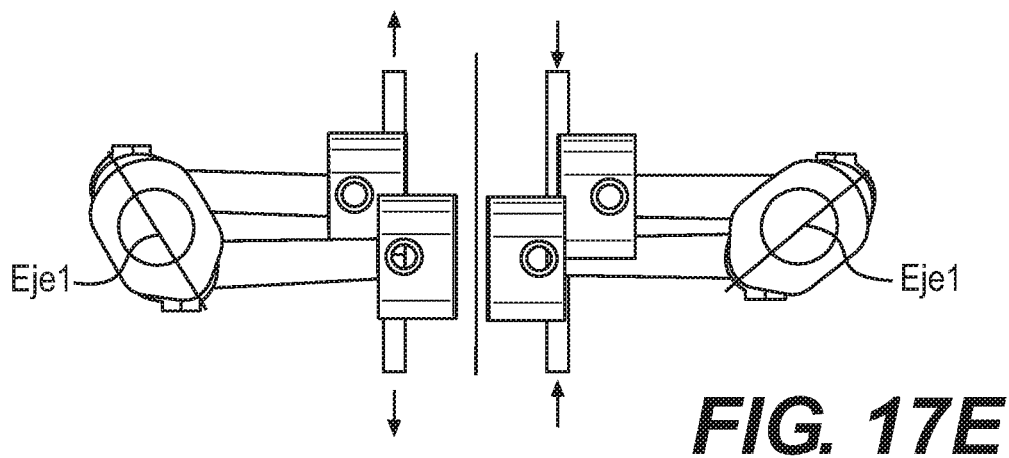
FIG. 17E shows the moment of exhaust ports closure, while the intake ports remain open, thus enabling overload in the cylinder.
Figure 17F:
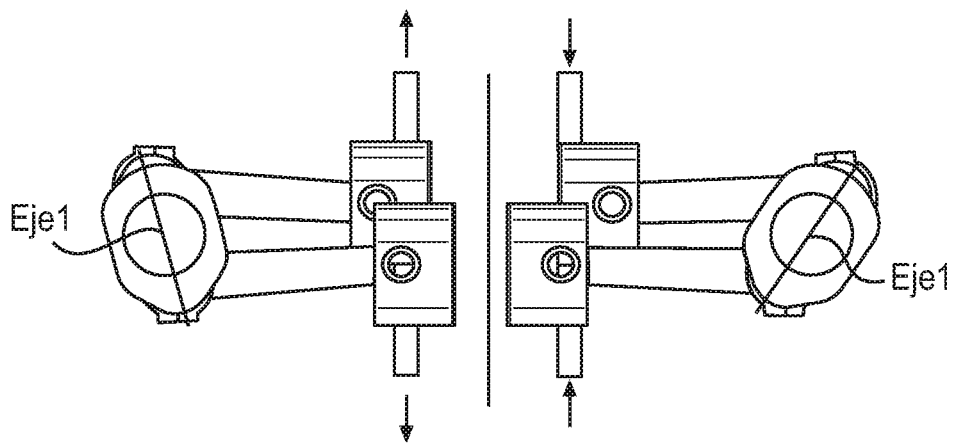
FIG. 17F shows the moment of closure of the intake ports and the start of compression.
Figure 17G:
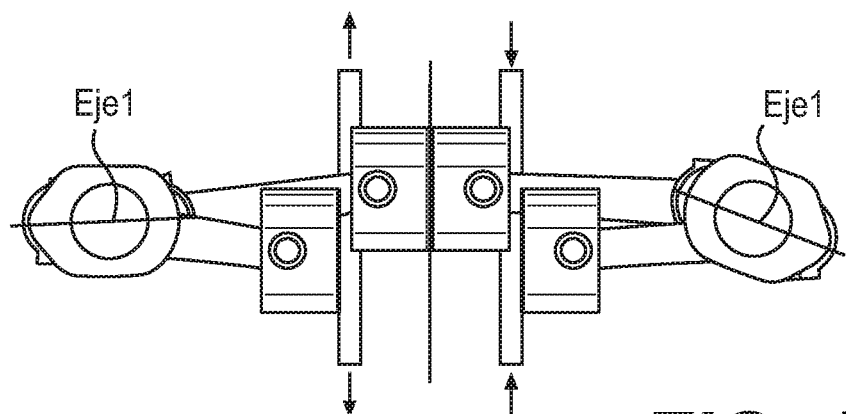
FIG. 17G shows the exhaust piston at its TDC when the intake piston is delayed and has not yet reached its TDC.
Figure 18A:
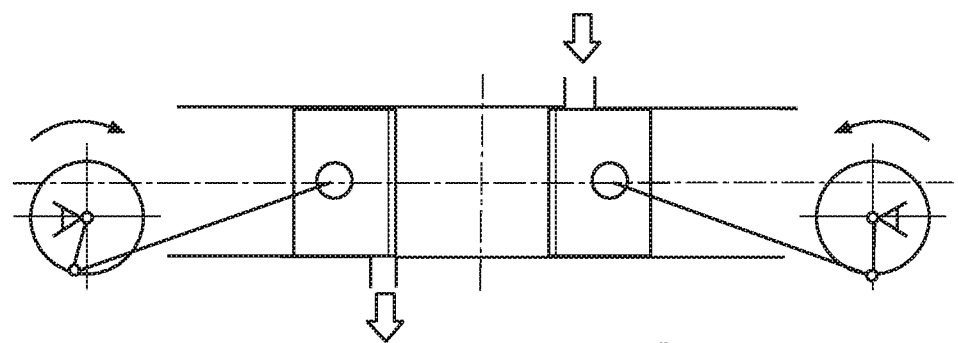
FIG. 18 is the operating sequence outlined for the images in FIG. 17.
Figure 18B:
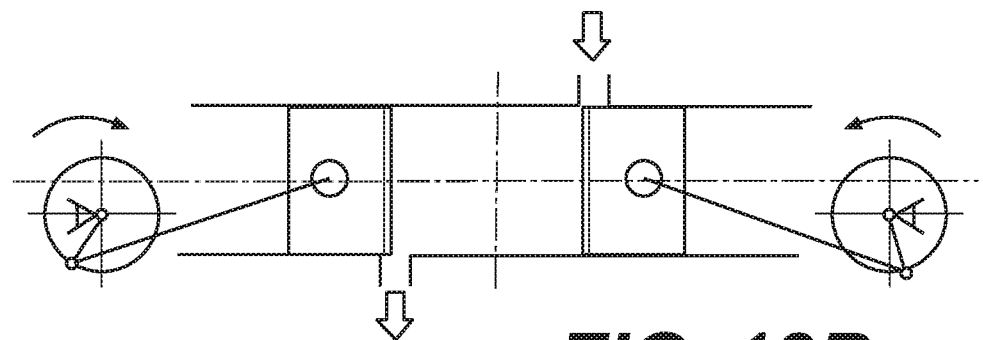
Figure 18C:
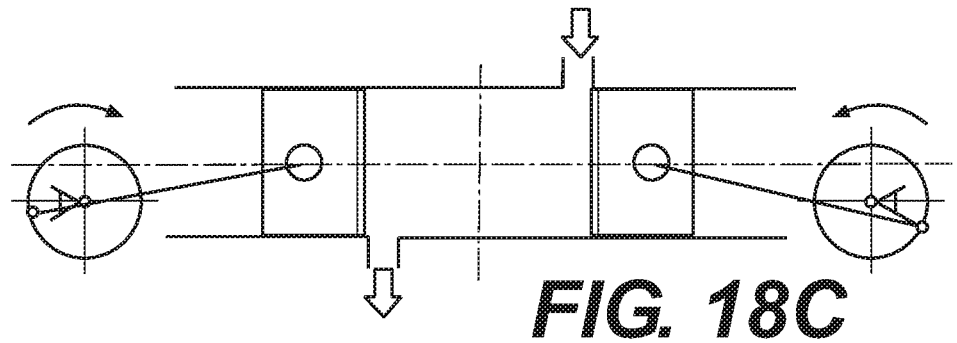
Figure 18D:
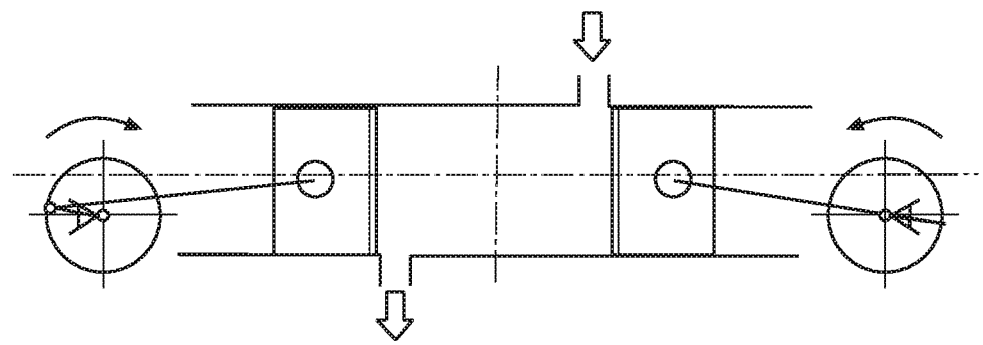
Figure 18E:
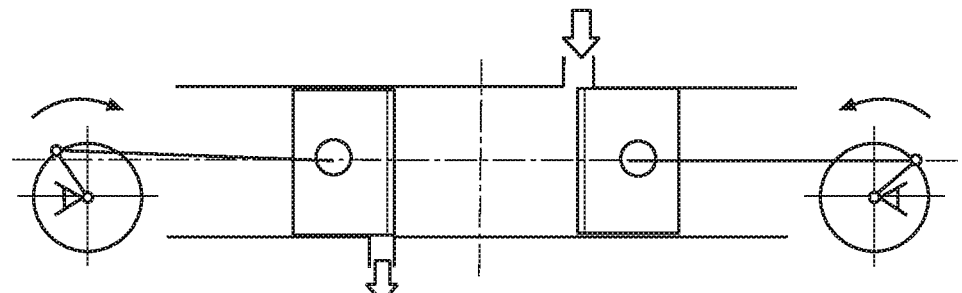
Figure 18F:
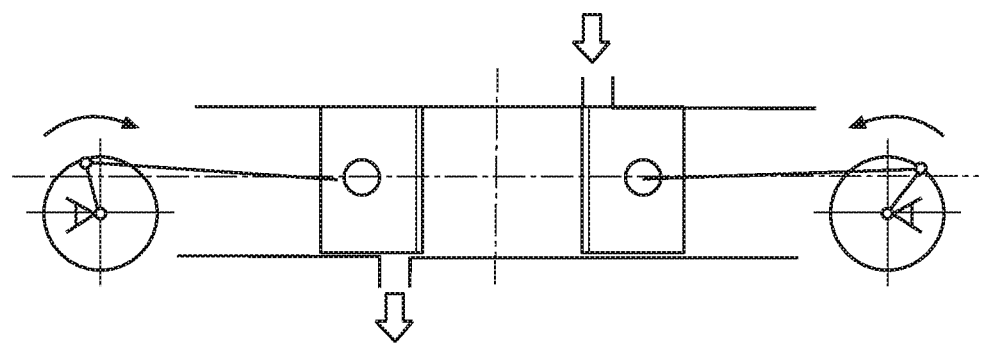
Figure 18G:
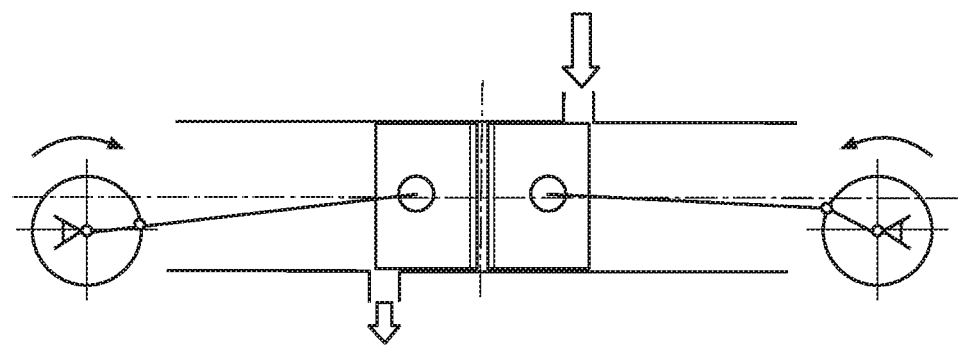
Figure 20:
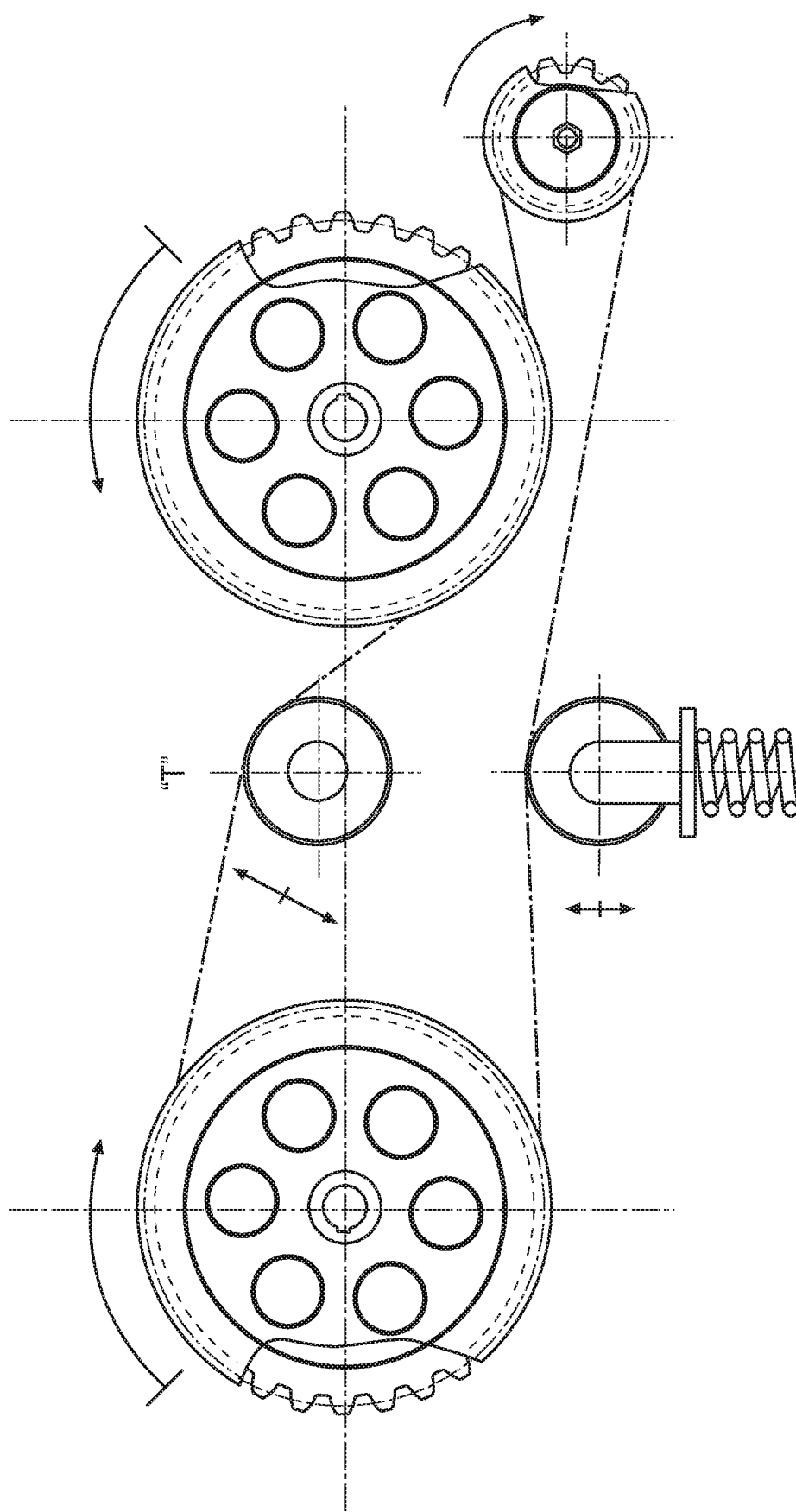
FIG. 20 shows how both crankshafts can be linked through a chain or belt, maintaining the counter-rotary rotation, and how by placing a displaceable "T" tensioner may vary the relative rotational position between both crankshafts, thus being able to vary the compression ratio in the cylinder.
Figure 21:
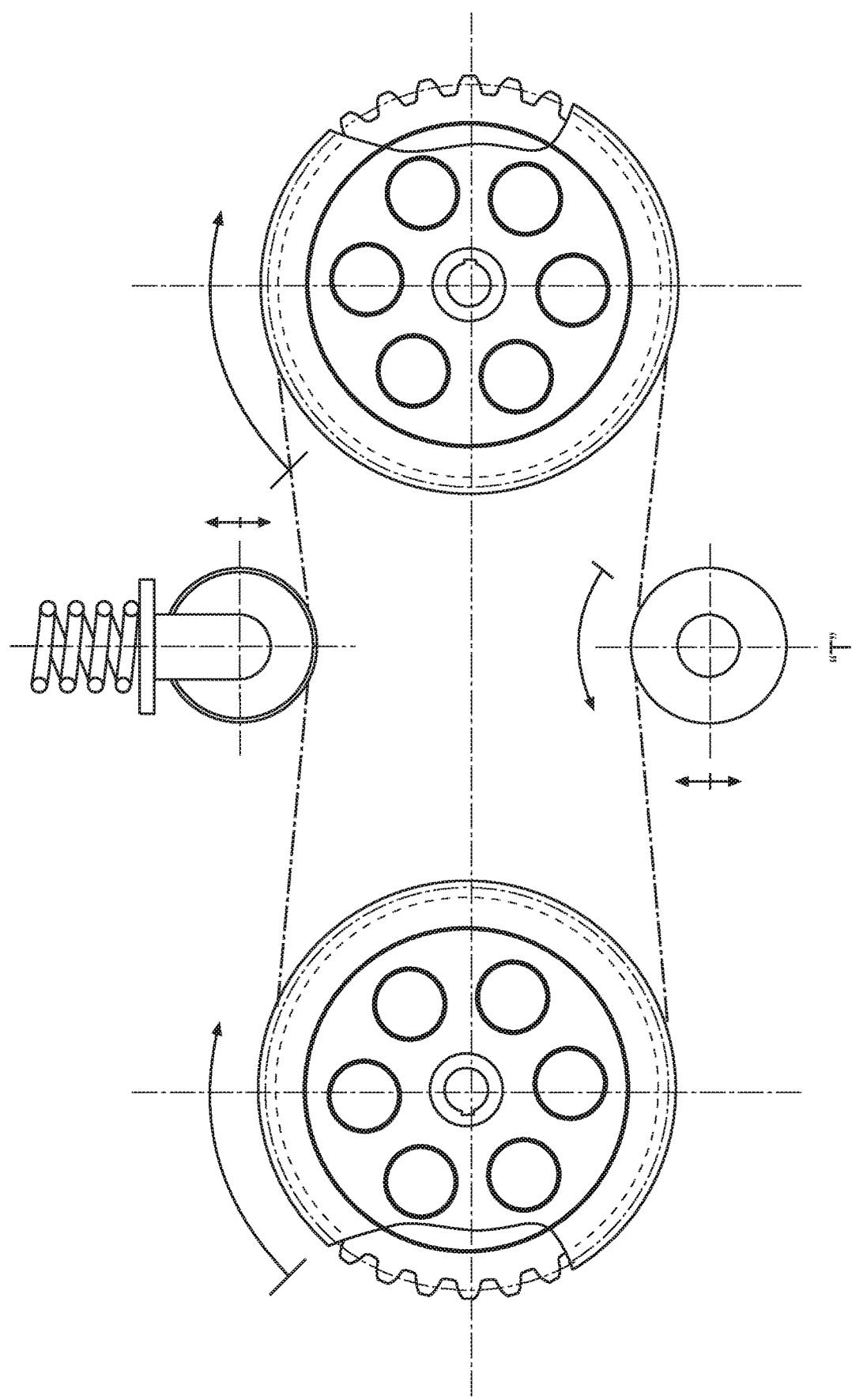
FIG. 21 shows how both crankshafts can be linked through a chain or belt to maintain their rotation in the same direction, and how by placing a displaceable "T" tensioner may vary the relative rotational position between both crankshafts, thus being able to vary the compression ratio in the cylinder.
Figure 22:
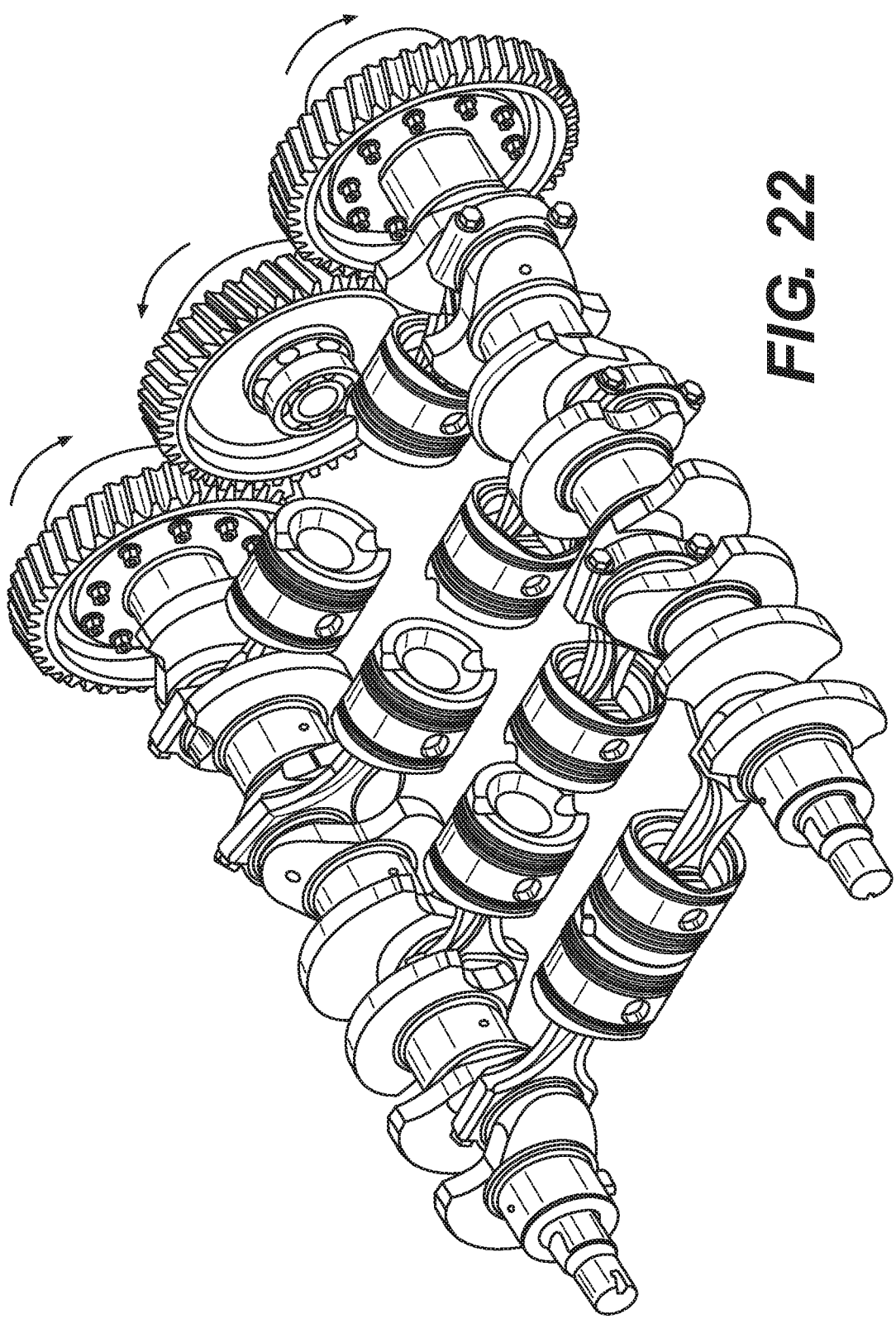
FIG. 22 shows a prior art concept for linking two crankshafts through a three gear train enabling the same direction of rotation.
Figure 23:
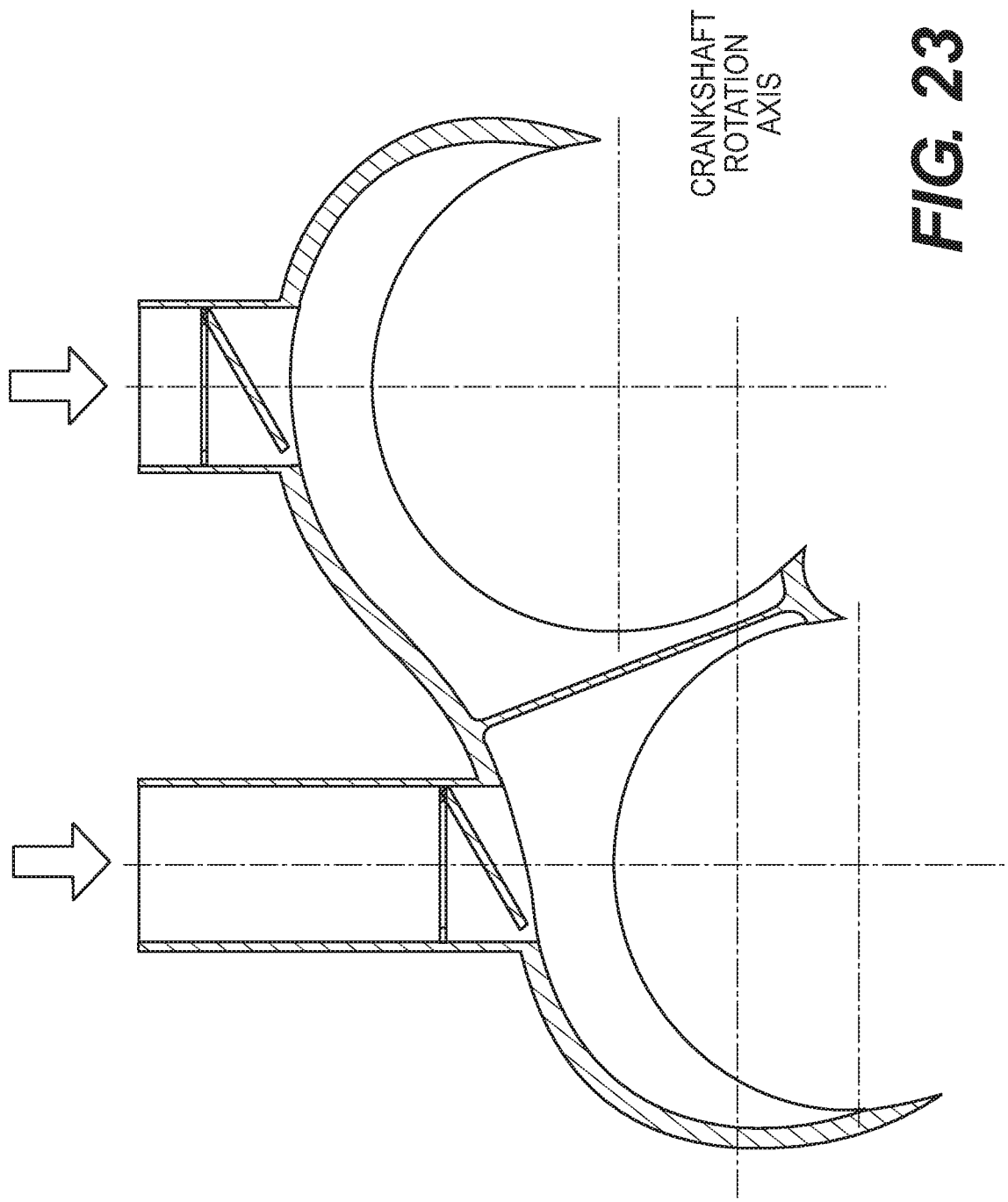
FIG. 23 shows a cut of two cylinders and a shared intake duct structure for an engine with embedded compressor chambers (not shown), where it can be seen that the body of the shared duct structure has a partition wall which prevents the compression performed by a cylinder compressor chamber to dissipate towards the intake for other cylinders. It also shows flapper-type valves that prevent the compression performed in the compressor chamber to dissipate towards the intake ducts.
Figure 24:
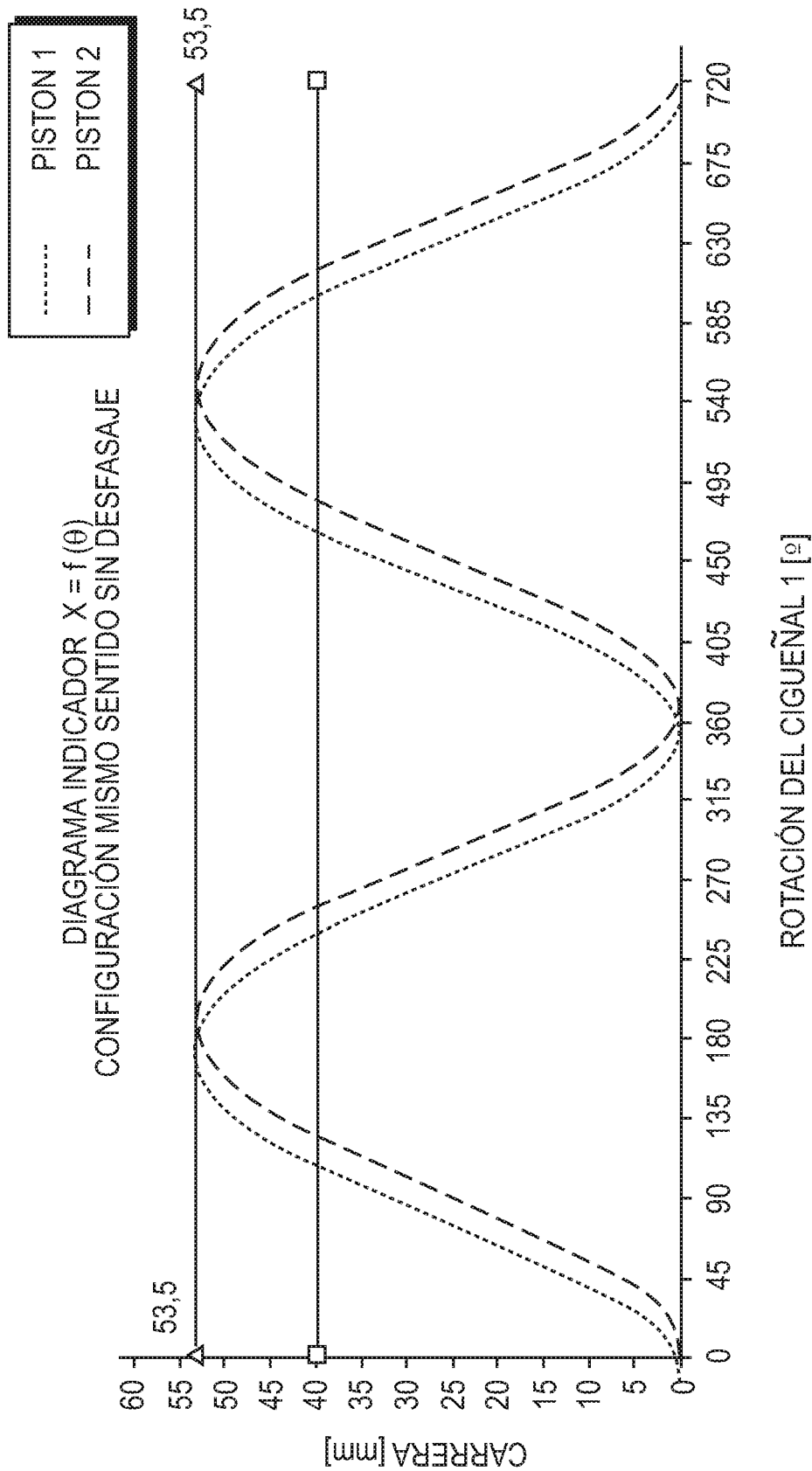
FIG. 24 is a diagram where opening and closing momentum of their respective intake and exhaust ports of each cylinder can be seen, for an engine having 1, 2, 3, or 4 cylinders, with its crankshafts rotating in the same direction without any advancement.
Figure 24:
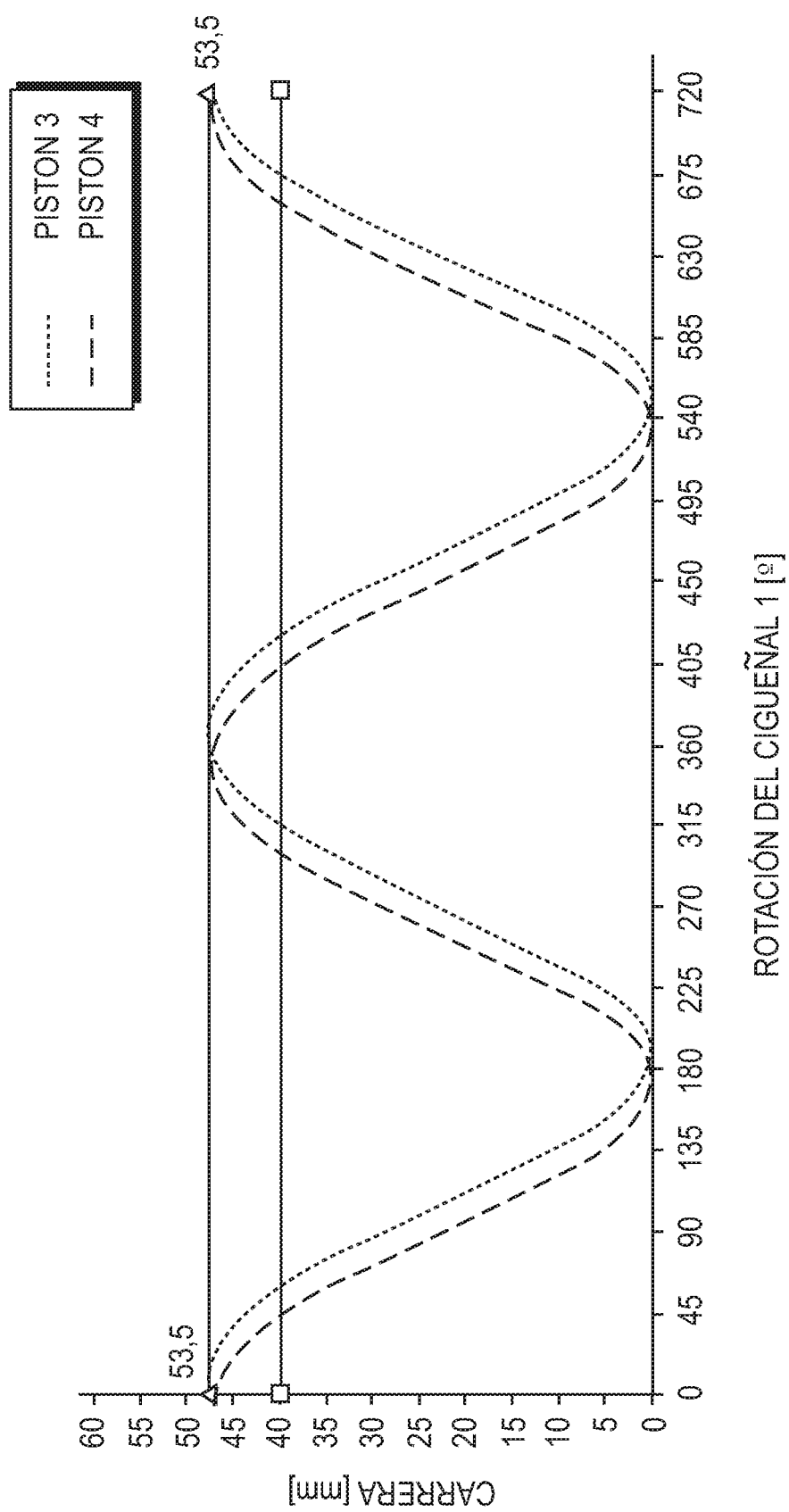
Figure 25:
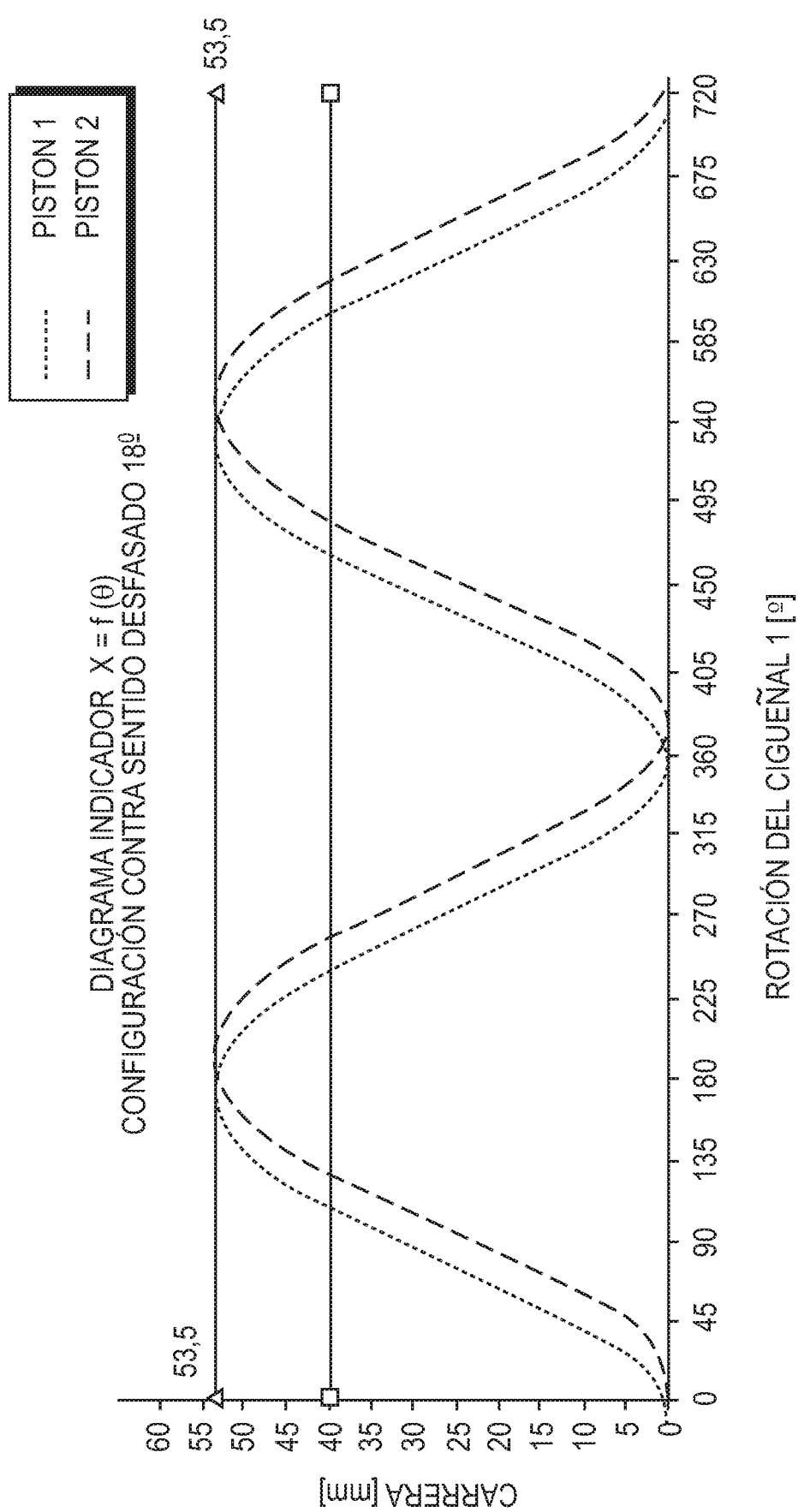
FIG. 25 is a diagram where opening and closing momentum of their respective intake and exhaust ports of each cylinder can be seen, for an engine having 1, 2, 3, or 4 cylinders, with its crankshafts rotating in opposite directions and in this case with an imposed advancement of 18°.
Figure 25:
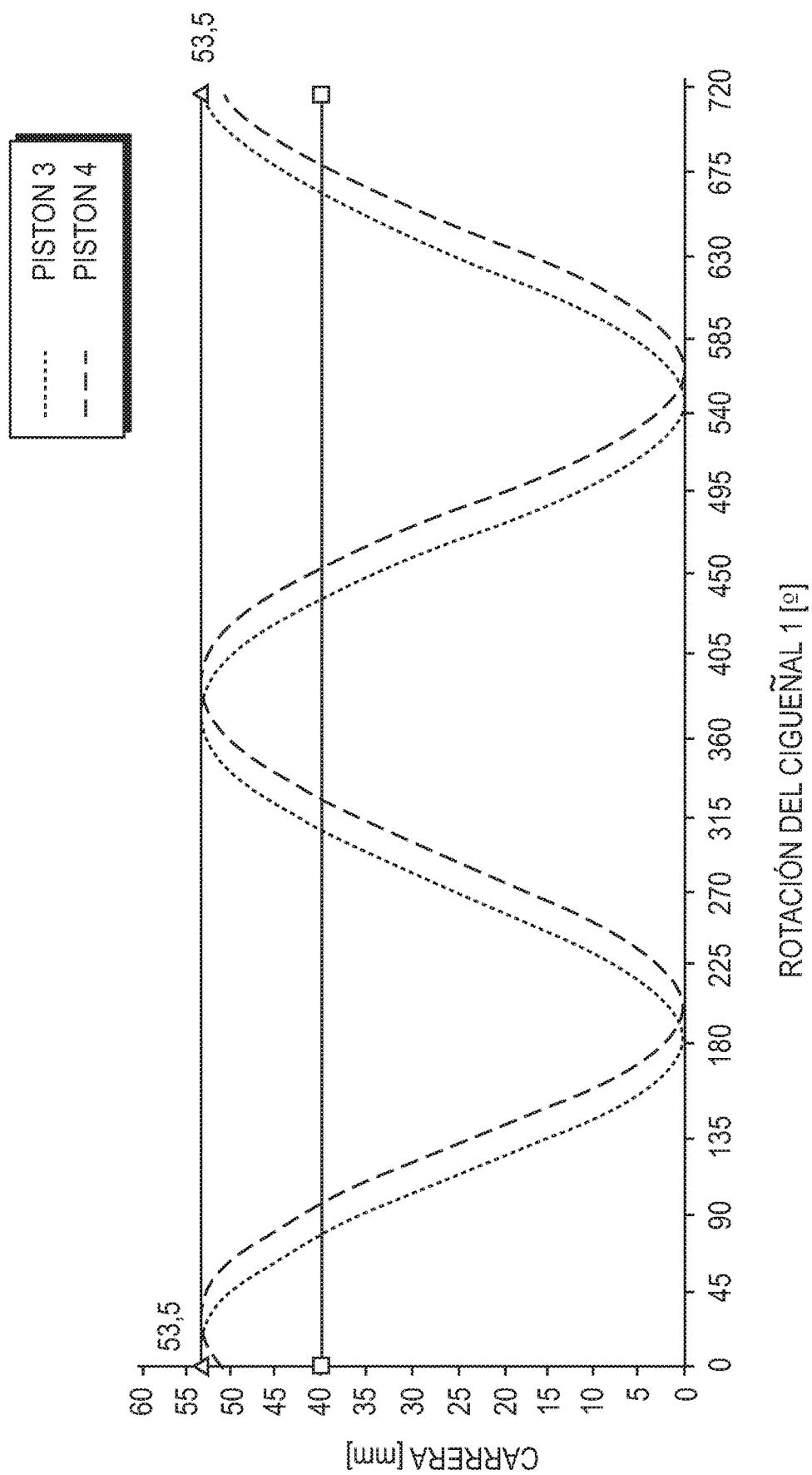
Figure 26:
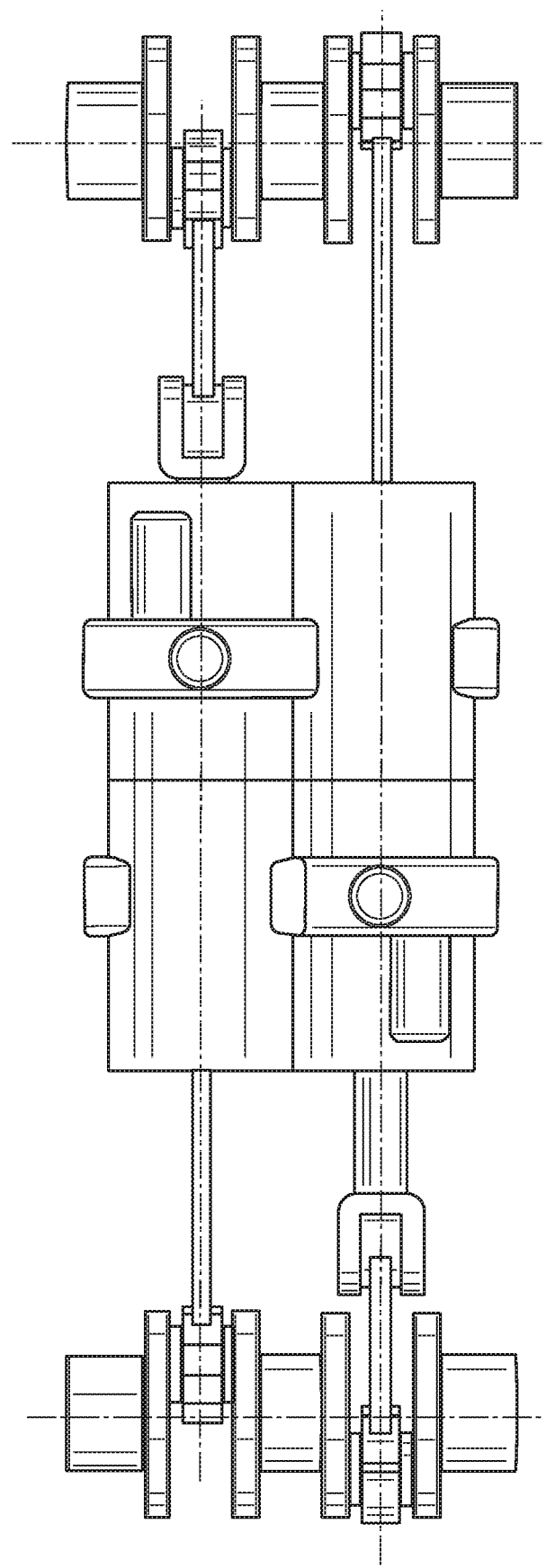
FIG. 26 is a upper view of a configuration of two cylinders with crankshafts rotating in the same direction. It is shown that, while in the previously disclosed schemes for such a configuration (FIG. 14 herein, for example), both the intake and exhaust ports which were alternated in the upper and lower parts of the engine, in previously discussed embodiments, it is possible to have the intake duct structure located at the cylinder's upper part, and the exhaust ducts structure in the cylinder's lower part. This can be applied to any number of cylinders.
Figure 27:
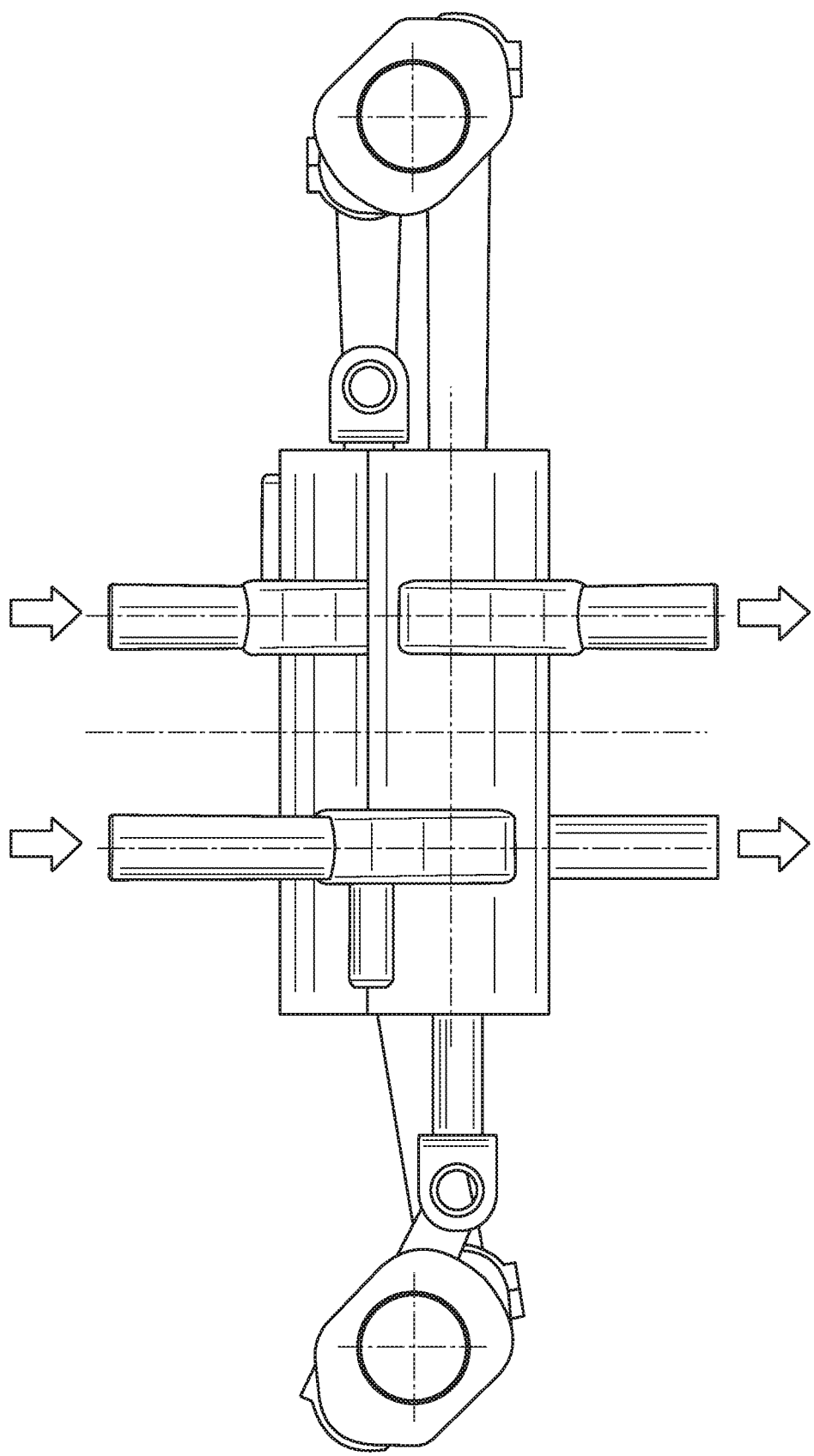
FIG. 27 is a side view where, in a configuration of two cylinders with crankshafts spinning in the same direction, the intake ducts are connected to the upper part of the cylinders and above the intake pistons.

The performance of one exemplary embodiment is depicted in FIGS. 14A and 15A, where piston 1 in cylinder 1 reaches the exhaust port before piston 2 in cylinder 1 reaches the intake port. This happens because the left crankshaft, which is linked to exhaust piston 1 and the exhaust port and rotates in a clockwise direction, distances the piston's longitudinal movement from the rotary point of its corresponding connecting rod in the crankshaft. In addition to the distance of shift of the rotational axis of the crankshaft from the cylinder axis (which is the same displacement of piston-pin center), the distance travelled is greater than that covered by the intake piston. The right crankshaft, which is linked in movement in the same direction as the left one, has a connecting rod rotary point closer to the cylinder axis, and therefore, the distance to be traveled is different from the exhaust piston. In this embodiment, the exhaust port will be placed in cylinder 1 on one side of the engine, in cylinder 2, the exhaust port will be located in the opposite side because the situation regarding the distances to be traveled by the corresponding connecting rods and the associated pistons is opposite to that described for cylinder 1. This situation of crossed admission (intake) and exhaust ports favors the thermal homogenization of the engine because it will not have the entire admission area cold on one side and the entire exhaust area hot on the other. This embodiment has great advantages for applications with high power requirements and to maintain high rpm ranges. If, on the other hand, both crankshafts are rotated in counter directions (see FIG. 3), it will be necessary to impose an advancement to the exhaust piston (6) in relation to the intake piston (5) to achieve an overload cycle, keeping the exhaust ports at the same side of the cylinder block and the intake ports in the opposite side (see FIG. 2). If both crankshafts are linked by a chain or strap, etc. (see FIG. 20), the compression relation can be varied using a "T" tensioner or equivalent, which can vary the relative positioning between both crankshafts.

SUMMARY OF THE INVENTION

In summary, this invention provides:

An opposed piston internal combustion engine comprising: at least two cylinders, each cylinder containing an intake piston and an exhaust piston arranged in opposite directions within a long axis of the cylinder and on opposite sides of the center of the long axis of the cylinder, and each cylinder comprising an inner wall defining the cylinder volume; wherein an upper surface of the piston heads of the two pistons in each cylinder create, in combination with the cylinder wall, a combustion chamber for igniting and burning of fuel, and wherein each cylinder comprises, independently, at least one intake port on an intake half of the cylinder and at least one exhaust port on an exhaust half of the cylinder, each port disposed as an opening in the cylinder wall from the center of the long axis of the cylinder (which can be independently any selected position); and at least two crankshafts; wherein a first crankshaft is attached to at least one intake piston, and a second crankshaft is attached to at least one exhaust piston; and wherein the plane that contains the cylinder long axes of at least one pair of cylinders is not perpendicular, nor parallel, nor coincident with the plane that contains crankshafts' rotational axis.

In embodiments, the engine comprises at least three cylinders and wherein a first crankshaft is attached to at least one intake piston, and a second crankshaft is attached to at least one exhaust piston.

In embodiments, the engine comprises an even number of cylinders, the first and second crankshafts are attached to the same number of exhaust and intake pistons.

In embodiments, adjacent cylinders of the engine have alternating configurations of exhaust ports and intake ports along their long axes.

In embodiments the engine comprises at least two pairs of cylinders, wherein the long cylinder axes are in different parallel planes, each of these different planes being parallel to the axes of the crankshafts' rotations.

In embodiments, the engine is characterized by having the plane or planes of the crankshafts' rotation axes being located in between the parallel planes of the planes of the cylinder axes.

In embodiments, the engine has two or more crankshafts that rotate in the same direction, for example two crankshafts that rotate in the same direction.

In embodiments, the engine of the invention includes an overpressure of air or air and fuel.

In some embodiments of the invention, the engine encompasses configurations in which at least one of the pistons comprises a solid bottom surface physically connected to a rigid stem via any suitable means; wherein at least one of the cylinders comprises a fixed disk positioned at or about the end of the cylinder, said disk sealing the cylinder from an air connection with the at least one crankshaft to which the piston is attached; wherein the rigid stem traverses the fixed disk by way of a sealable hole in the fixed disk; wherein the piston's solid bottom surface, the cylinder wall, and the fixed disk form a compressor chamber; and wherein the at least one cylinder comprises at least one compressor port in the cylinder wall at about the end of the cylinder for recirculation of air from the compressor chamber to at least one intake or exhaust port. The compressor port is disposed in the cylinder wall such that pressure from the piston moving toward the crankshaft moves air or other fluids through the compressor port until the compressor port is closed by the piston.

In some embodiments, each or some of the intake pistons of the engine comprises a solid bottom surface connected to a rigid stem, wherein the at least one cylinder comprises a fixed disk positioned at or about the end of the cylinder on the side of the intake piston, said disk sealing the cylinder from an air connection with the at least one crankshaft to which the intake piston is attached, wherein the rigid stem traverses the fixed disk by way of a sealable hole in the fixed disk, wherein the intake piston's solid bottom surface, the cylinder wall, and the fixed disk form a compressor chamber, and wherein the at least one cylinder comprises at least one compressor port in the cylinder wall at about the end of the cylinder for recirculation of air from the compressor chamber to at least one intake port.

In embodiments, the intake port of the engine is also connected to an intake duct that supplies an overpressure of air or an air and fuel mixture to the cylinder combustion chamber, and which comprises a means for blocking the air or air and fuel mixture from the compressor chamber toward the source of the overpressure air or air and fuel mixture.

In some embodiments, the at least one exhaust piston is connected to its corresponding crankshaft directly by way of a connecting rod and wherein the at least one intake piston is connected to its corresponding crankshaft indirectly by way of connection of the rigid stem to a connecting rod.

In embodiments, at least one of the pistons comprises two sets of rings, wherein each set of rings comprises at least one compression ring. In embodiments, the two sets of rings are disposed at the upper portion of the piston, wherein another set of rings is disposed at the bottom portion of the piston, and wherein the bottom set of rings comprises at least one oil retention ring.

In embodiments, both sets of rings are disposed on the pistons such that, when a piston is at its upper dead center, the sets of rings in conjunction with the cylinder wall define a chamber that encompasses the intake or exhaust ports, thus sealing and separating the ports from the combustion chamber and the crankcase.

In embodiments, the intake piston and the exhaust piston of each cylinder are disposed within the cylinder such that the intake piston is delayed in its movement back and forth through the cylinder as compared to the exhaust piston by a pre-established, unvarying delay, wherein the delay is defined by an angle of deflection from a line parallel to the long axis of the cylinder.

In embodiments, the pre-established delay between the first and the second piston is due to an offset of one crankshaft as compared to the other from about 4° to about 25°, such as about or exactly 18°.

In embodiments, employing two crankshafts, both crankshafts rotate in the same direction, and the pre-established delay between pistons within a cylinder is totally or partially achieved through changing the distance of the long axis of the cylinders from the plane that contains the crankshaft rotation axis.

In embodiments, the pre-established delay between the first and the second piston is from about 4° to about 25°, for example about or exactly 18°.

In embodiments, the engine according to the invention can comprise two or more cylinders in the form of a cylinder block; wherein the intake ports in one or more of the cylinders are connected to intake ducts and the exhaust ports in one or more of the cylinders are connected to exhaust ducts, and wherein the intake ducts are alternated on one side of the cylinder block with the exhaust ducts, and on the other side of the cylinder block the exhaust ducts are alternated with the intake ducts.

In embodiments, the engine according to the invention has the feature that each cylinder is capable of meeting the volumetric requirements for that cylinder without the need for an external compressor.

In embodiments, the invention encompasses an engine that includes two or more cylinders, wherein the location of the plane of, or holding or containing, the rotation axes of the crankshafts is at half the distance between the parallel planes of, or holding or containing, the long axes of at least two of the cylinders. In non-exclusive embodiments, the invention encompasses an engine that includes two or more cylinders defining a plane between their longitudinal axes (i.e., a plane between the long axis of one cylinder and the long axis of the other cylinder), wherein the plane is not parallel, perpendicular, or coincident with the plane of the rotation of a crankshaft.

The engine of the present invention can comprise two cylinders and two crankshafts, wherein the plane that defines the long axis of the cylinders is perpendicular to the rotational axes of the crankshafts, resulting in a "V" shape for the engine.

In embodiments, the engine comprises two or more crankshafts, and the two or more crankshafts are physically connected to each other by means of gears, a chain, a strap, a universal joint, a pinion and crown wheel, or any combination thereof, or by means of the use of any mechanical element fit for the purpose.

The engine of the invention can include a variable tensioner that can change the compression ratio of each cylinder by modifying the relative rotational position between crankshafts.

In embodiments, the two crankshafts are physically connected to each other by way of at least one gear train or at least one connecting bar, which can be two connecting bars, each of which is elastic, allowing for expansion and contraction as the engine temperature varies.

The engine of the invention can further comprise at least one auxiliary combustion chamber in fluid connection with the combustion chamber, the volume of which may be adjusted.

As would be understood by those of ordinary skill in the art, the present invention includes all vehicles driven by internal combustion engines, including, but not limited to a vehicle or a stationary engine unit comprising the engine of claim 1, wherein the vehicle or stationary engine unit is terrestrial, a water vessel, or an airplane.

It will be apparent to those skilled in the art that various modifications and variations can be made in the practice of the present invention and in construction of this engine without departing from the scope or spirit of the invention. Other embodiments of the invention will be apparent to those skilled in the art from consideration of the specification and practice of the invention. It is intended that the specification and figures are to be considered as exemplary only, with a true scope and spirit of the invention being indicated by the following claims.

The invention claimed is:

1. An opposed piston internal combustion engine comprising:
    at least two cylinders, each cylinder containing an intake piston and an exhaust piston arranged in opposite directions within a long axis of the cylinder and on opposite sides of the center of the long axis of the cylinder, and each cylinder comprising an inner wall defining the cylinder volume;
    wherein an upper surface of the piston heads of the two pistons in each cylinder create, in combination with the cylinder wall, a combustion chamber for igniting and burning of fuel, and
    wherein each cylinder comprises, independently, at least one intake port on an intake half of the cylinder and at least one exhaust port on an exhaust half of the cylinder, each port disposed as an opening in the cylinder wall; and
    at least two crankshafts;
    wherein a first crankshaft is attached to at least one intake piston, and a second crankshaft is attached to at least one exhaust piston; and wherein a plane that contains the cylinder long axes of at least one pair of cylinders is not perpendicular, nor parallel, nor coincident with a plane that contains the rotational axes of the first and second crankshafts.

2. The engine of claim 1, wherein the engine comprises at least three cylinders and wherein a first crankshaft is attached to at least one intake piston, and the second crankshaft is attached to at least one exhaust piston.

3. The engine of claim 1, wherein, when the engine comprises an even number of cylinders, the first and second crankshafts are attached to the same number of exhaust and intake pistons.

4. The engine of claim 1, wherein adjacent cylinders of the engine have alternating configurations of exhaust ports and intake ports along their long axes.

5. The engine of claim 1, comprising at least two pairs of cylinders, wherein the long cylinder axes of each cylinder are in different parallel planes, each of these different parallel planes being parallel to the rotational axes of the crankshafts.

6. The engine of claim 1, wherein the plane or planes containing the rotational axes of the crankshafts are located in between the parallel planes of the planes of the cylinder axes.

7. The engine of claim 1, wherein both crankshafts rotate in the same direction.

8. The engine of claim 1, wherein the engine includes an overpressure of air or air and fuel.

9. The engine of claim 1,
wherein at least one of the pistons comprises a solid bottom surface connected to a rigid stem;
wherein at least one of the cylinders comprises a fixed disk positioned at or about the end of the cylinder, said disk sealing the cylinder from an air connection with the at least one crankshaft to which the piston is attached;
wherein the rigid stem traverses the fixed disk by way of a sealable hole in the fixed disk;
wherein the piston's solid bottom surface, the cylinder wall, and the fixed disk form a compressor chamber; and
wherein the at least one cylinder comprises at least one compressor port in the cylinder wall at about the end of the cylinder for recirculation of air from the compressor chamber to at least one intake or exhaust port.

10. The engine of claim 1, wherein each of the intake pistons comprises a solid bottom surface connected to a rigid stem;
wherein the at least one cylinder comprises a fixed disk positioned at or about the end of the cylinder on the side of the intake piston, said disk sealing the cylinder from an air connection with the at least one crankshaft to which the intake piston is attached;
wherein the rigid stem traverses the fixed disk by way of a sealable hole in the fixed disk;
wherein the intake piston's solid bottom surface, the cylinder wall, and the fixed disk form a compressor chamber; and
wherein the at least one cylinder comprises at least one compressor port in the cylinder wall at about the end of the cylinder for recirculation of air from the compressor chamber to at least one intake port.

11. The engine of claim 10, wherein the intake port is also connected to an intake duct that supplies an overpressure of air or an air and fuel mixture to the cylinder combustion chamber, and which comprises a means for blocking the air or air and fuel mixture from the compressor chamber toward the source of the overpressure air or air and fuel mixture.

12. The engine of claim 10, wherein the at least one exhaust piston is connected to its corresponding crankshaft directly by way of a connecting rod and wherein the at least one intake piston is connected to its corresponding crankshaft indirectly by way of connection of the rigid stem to a connecting rod.

13. The engine of claim 1, wherein at least one of the pistons comprises two sets of rings, wherein each set of rings comprises at least one compression ring.

14. The engine of claim 13, wherein one of the two sets of rings is disposed at the upper portion of the piston, wherein another set of rings is disposed at the bottom portion of the piston, and wherein the bottom set of rings comprises at least one oil retention ring.

15. The engine of claim 14, wherein both sets of rings are disposed on the pistons such that, when a piston is at its upper dead center, the sets of rings in conjunction with the cylinder wall define a chamber that encompasses the intake or exhaust ports, thus sealing and separating the ports from the combustion chamber and the crankcase.

16. The engine of claim 1, wherein the intake piston and the exhaust piston of each cylinder are disposed within the cylinder such that the intake piston is delayed in its movement back and forth through the cylinder as compared to the exhaust piston by a pre-established, unvarying delay, wherein the delay is defined by an angle of deflection from a line parallel to the long axis of the cylinder.

17. The engine of claim 16, wherein the pre-established delay between the first and the second piston is due to an offset of one crankshaft as compared to the other from about 4° to about 25°.

18. The engine of claim 17, wherein the pre-established delay is about 18°.

19. The engine of claim 16, wherein both crankshafts rotate in the same direction and wherein the pre-established delay between pistons is totally or partially achieved through changing the distance of the long axis of the cylinders from the plane that contains the crankshaft rotation axis.

20. The engine of claim 19, wherein the pre-established delay between the first and the second piston is from about 4° to about 25°.

21. The engine of claim 20, wherein the pre-established delay is about 18°.

22. The engine of claim 1, comprising two or more cylinders in the form of a cylinder block;
wherein the intake ports are connected to intake ducts and the exhaust ports are connected to exhaust ducts, and
wherein the intake ducts are alternated on one side of the cylinder block with the exhaust ducts, and on the other side of the cylinder block the exhaust ducts are alternated with the intake ducts.

23. The engine of claim 9, wherein each cylinder is capable of meeting the volumetric requirements for that cylinder without the need for an external compressor.

24. The engine of claim 1, comprising two or more cylinders, wherein the location of the planes holding rotation axes of the crankshafts is at half the distance between the parallel planes holding the long axes of the cylinders.

25. The engine of claim 1, wherein the two or more crankshafts are physically connected to each other by means of gears, a chain, a strap, a universal joint, a pinion and crown wheel, or any combination thereof, or by means of the use of any mechanical element fit for the purpose.

26. The engine of claim 25, comprising two cylinders, wherein the plane that defines the long axis of the cylinders is perpendicular to the rotational axes of the crankshafts, resulting in a "V" shape for the engine.

27. The engine of claim 1, further comprising a variable tensioner that can change the compression ratio of each cylinder by modifying the relative rotational position between crankshafts.

28. The engine of claim 1, wherein the two crankshafts are physically connected to each other by way of at least one gear train or at least one connecting bar.

29. The engine of claim 28, wherein the two crankshafts are physically connected to each other by way of two connecting bars, each of which is elastic, allowing for expansion and contraction as the engine temperature varies.

30. The engine of claim 1, wherein the engine further comprises at least one auxiliary combustion chamber in fluid connection with the combustion chamber, the volume of which may be adjusted.

31. A vehicle or a stationary engine unit comprising the engine of claim 1, wherein the vehicle or stationary engine unit is terrestrial, a water vessel, or an airplane.

* * * * *